United States Patent [19]

Moursund

[11] Patent Number: 5,594,847

[45] Date of Patent: Jan. 14, 1997

[54] SYSTEM AND METHOD FOR SELECTING FREE FORM OBJECTS ASSOCIATED WITH A SELECTION REGION DISPLAYED BY A COMPUTER

[75] Inventor: Elizabeth A. Moursund, Bellevue, Wash.

[73] Assignee: Microsoft Corporation, Redmond, Wash.

[21] Appl. No.: 378,710

[22] Filed: Jan. 27, 1995

[51] Int. Cl.[6] .................................................. G06T 11/00
[52] U.S. Cl. ............................ 395/133; 395/326; 395/792
[58] Field of Search ....................................... 395/133, 134, 395/135, 139, 140, 141, 144–149, 155, 157, 158, 161

[56] References Cited

PUBLICATIONS

Simpson "Mastering Wordperfect 5.1 and 5.2 for Windows" 1993.
Microsoft Access User's Guide, 1992, pp. 198–200 and 358–360.
Lotus 1–2–3 User's Guide, 1991, pp. 23–31.

*Primary Examiner*—Almis R. Jankus
*Attorney, Agent, or Firm*—Jones & Askew

[57] ABSTRACT

A method for selecting objects from a ruler provides a simple process for selecting a plurality of free form objects that lie approximately in a line. Free form objects, which are not required to be aligned in rows and columns, are positioned in a window generated by an application program. The window also includes vertical and horizontal rulers along its left and top edges, respectively. To select objects that lie along a single horizontal line, the user moves the cursor over the vertical ruler. This causes the cursor becomes a fight-pointing arrow. When the use presses the mouse button, a horizontal line is extended across the screen. When the mouse button is released, all of the objects that intersect the line are redrawn to indicate that they have been selected. Adjacent "rows" of objects may be selected by dragging the mouse along the ruler while the mouse button is pressed. Non-adjacent rows of objects may be selected by holding down the SHIFT key on the keyboard while pressing the mouse button. Columns of objects may be selected in a similar fashion by moving the mouse over the horizontal ruler, which causes the cursor to become a downward-pointing arrow.

45 Claims, 20 Drawing Sheets

SYSTEM AND METHOD FOR SELECTING FREE FORM OBJECTS ASSOCIATED WITH A SELECTION REGION DISPLAYED BY A COMPUTER

TECHNICAL FIELD

The present invention relates to methods of selecting objects displayed by computer programs that employ a graphical user interface, and more particularly relates to a method for selecting free form objects from a selection identification zone located adjacent an area containing the objects.

BACKGROUND OF THE INVENTION

Many programs for personal computers allow "free form" placement of graphic objects within a document or window. This allows a user to place objects at any desired position within the document without requiring the objects to be aligned in rows or columns.

Free form object placement is useful in many different types of programs. For example, presentation and drawing programs allow a user to create various types of graphs, charts, pictures, etc. by placing various objects (e.g., circles, rectangles, lines, text, etc.) in the document. Database programs allows users to create custom reports and forms by arranging labels, text, lines, etc. to meet their specific requirements.

After objects are placed in a document, a user may want to select one or more objects in order to perform various functions on them. For example, once an object is selected, it may be deleted, duplicated, moved, resized, or edited in some other fashion. In many cases, a user may want to select a group of objects and perform the same function on them simultaneously.

In most graphic operating systems and application programs, a single object is selected by moving the mouse so that the mouse cursor points to the object, and then clicking (i.e., pressing and releasing) the appropriate mouse button. An object may be moved by dragging (i.e., moving the mouse while holding down the mouse button) the object and dropping it (i.e., releasing the mouse button) at the desired location. A file associated with an icon may be executed or opened by double clicking on the icon associated with the file.

In the prior art, a group of objects may be selected in one of two ways. One method requires the user to click on the first object and then to hold down the SHIFT key (on the keyboard) while clicking on the other objects that are to be selected. The second method allows a user to selected a group of adjacent objects by dragging the mouse to form a rectangular selection box around the desired objects. Depending on the parameters of the specific program, the selected objects will include those that are contained entirely within the box, or those that intersect the box. In order to select all of the objects that lie approximately in a row or column, the user must drag the mouse to draw a box that extends across the entire width or length of the document. This can be somewhat tedious if the document is wider than the area visible in the displayed window.

Some application programs, such as spreadsheets, require that data be entered in cells that are arranged in rows and columns. In these application programs, the user may select all of the cells that lie in a row or column with a single click of the mouse button. For example, to select a column of cells, the user moves the mouse cursor to an area immediately above the desired column, and clicks the mouse button. Likewise, a row of cells is selected by moving the mouse cursor to an area immediately to the left of the desired row and clicking the mouse button. This allows a user to select an entire row or column regardless of whether the row or column extends beyond the edge of the display and includes objects that are not visible in the displayed window.

Entire rows and columns may be easily selected in application programs that require data to be arranged in rows and columns. However, programs that allow free form placement of objects do not provide a simple method of selecting all of the objects that lie approximately in a row or column. Therefore, there is a need in the art for a method for selecting a plurality of free form objects that lie along vertical or horizontal selection lines.

SUMMARY OF THE INVENTION

The present invention satisfies the above-described needs by providing a system and method for selecting free form objects. Generally described, the present invention provides a method for selecting a set of free form objects displayed by a computer. The method displays an area containing a plurality of free form objects and provides a selection identification zone associated with the area. The method determines when a selection indicator is positioned within the selection identification zone and establishes a selection region corresponding to the position of the selection indicator. The set of free form objects is selected by identifying those free form objects that intersect the selection region.

More particularly described, the method of the present invention receives position data, which is indicative of the position of the selection indicator, from a pointing device associated with the computer. The method also receives button data from a button associated with the pointing device and establishes the selection region in response to the button being pressed while the selection indicator is positioned within the selection identification zone.

In another aspect, the present invention provides a computer system for selecting free form objects. The system includes a central processing unit (CPU), a display coupled to the CPU for displaying information, and an input device coupled to the CPU for manipulating a selection indicator displayed on the display. The CPU is operative to display an area and a selection identification zone adjacent the area. The displayed area includes a plurality of free form objects. The CPU determines if the selection indicator is positioned over the selection identification zone and identifies a selection region within the area while the selection indicator is positioned over the selection identification zone. The CPU then determines which of the free form objects intersect the selection region.

More particularly described, the computer system of the present invention includes a selection button associated with the computer. The CPU is also operative to determine if the button is pressed or released. The CPU identifies the selection region in response to the button being pressed while the selection indicator is positioned over the selection region.

It is therefore an object of the present invention to provide a simplified method for selecting free form objects located in a predetermined relationship to a selection indicator.

It is a further object of the present invention to provide a system for selecting free form objects displayed by a computer.

It is a further object to provide a method for automatically selecting free form objects that lie in a selection path without requiring further user selection.

It is a further object of the present invention to provide a method for selecting free form objects that lie along a horizontal or vertical selection line extending from a selection indicator.

It is a further object of the present invention to provide a method for selecting free form objects that lie in a selection region bounded by two parallel selection lines.

It is a further object of the present invention to provide a method for selecting non-adjacent groups of free form objects that lie along horizontal or vertical selection lines.

DETAILED DESCRIPTION OF THE PREFERRED EMBODIMENT

Figure 1:
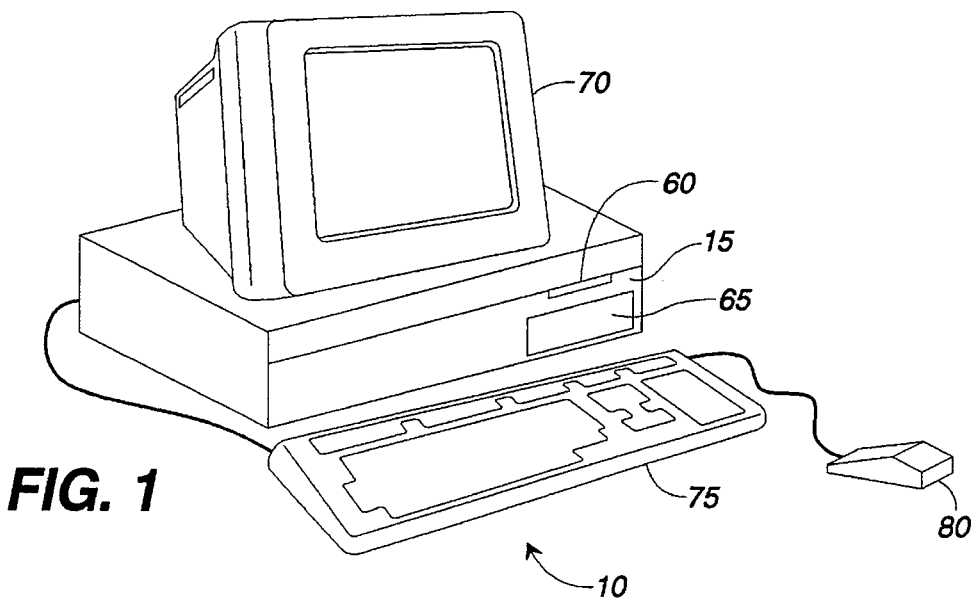
FIG. 1 is an illustration of a personal computer suitable for use in implementing the present invention.

Turning first to the nomenclature of the specification, the detailed description that follows is represented largely in terms of algorithms and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures supplied by one or more the memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, an "algorithm" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

Furthermore, it should be kept in mind that there is a distinction between the methods, steps, or operations completed by a computer, and a method of computation itself. Although computations are performed by computers, the present invention relates to methods, processes, steps, or operations carried out by a computer for the purpose processing electrical or other physical signals to generate desired physical signals and to display results and interactions. The present invention solves a shortcoming in prior art methods for selecting objects displayed by a computer by providing a simple, efficient method for selecting free form objects having a specified display relationship.

In addition, it should be understood that the programs, algorithms, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environment will be described.

The Operating Environment

Figure 2:
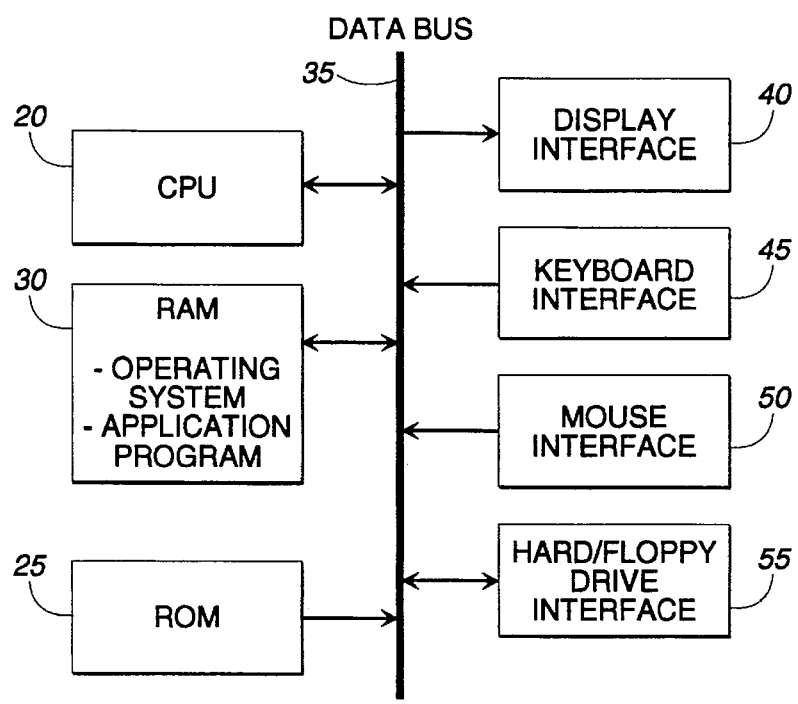
FIG. 2 is a block diagram showing the principle components of the processor chassis in the personal computer of FIG. 1.
Figure 3:
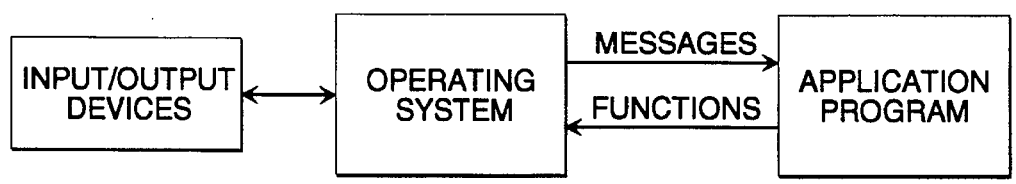
FIG. 3 is a block diagram illustrating the interface between a computer's input/output devices, an operating system, and an application program.

FIGS. 1–3 illustrate various aspects of the computing environment in which the present invention is designed to operate. Those skilled in the art will immediately appreciate that FIGS. 1–3, and the associated discussion, are intended to provide a brief, general description of the preferred computer hardware, operating system and application program, and that additional information is readily available in the appropriate programming manuals, user's guides, and similar publications.

FIGS. 1 and 2 illustrate a conventional IBM-compatible personal computer 10 suitable for implementing the present invention. As shown in FIG. 1, the personal computer 10 includes a processor chassis 15, which houses a mother board and other printed circuit boards (not shown) of the type conventionally used in a personal computer.

The mother board, which is illustrated in the block diagram of FIG. 2, includes a central processing unit (CPU) 20, such as the 80486 or "PENTIUM" microprocessors manufactured by Intel. The mother board also includes read only memory (ROM) 25 and random access memory (RAM) 30, which are connected to the CPU by the data bus 35. Also connected to the CPU 20 via the data bus 35 are a display interface 40, keyboard interface 45, mouse interface 50, and a hard drive/floppy drive interface 55. Although many other internal components of the processor chassis 15 are not shown, those of ordinary skill in the art will appreciate that such components and the interconnection between them are well known. Accordingly, additional details concerning the internal construction of the personal computer 10 need not be disclosed in connection with the present invention.

Referring again to FIG. 1, the personal computer 10 includes a floppy drive 60 and a hard drive 65, which are connected to the CPU via the hard drive/floppy drive interface 55 (FIG. 2), for use in reading data from and writing data to magnetic media. The personal computer displays data of various types on a display 70. A user enters commands and information into the personal computer 10 by using a keyboard 75 and/or a pointing device such as a mouse 80. Other types of pointing devices include a track pad, track ball or other device suitable for positioning a cursor on a computer display.

Those skilled in the art will understand that the operating system, application programs and data are provided to the computer via one of its memory devices, which include the hard drive, floppy drive, RAM and ROM. In the preferred computer 10, the hard drive 65 is used to store data and programs, including the operating system and the application program that embodies the present invention. When the personal computer 10 is turned on or reset, it loads the operating system from the hard drive 65 into the RAM 30. Once the operating system is loaded into RAM, the CPU 20 executes the operating system code and causes the visual elements associated with the operating system to be displayed on the display 70. When the application program is opened by a user, the program code and relevant data are read from the hard drive 65 and stored in the RAM 30.

The preferred embodiment of the present invention is designed to operate with Microsoft Corporation's "WINDOWS" operating system, which provides a graphical user interface. However, it should be understood that the invention can readily be implemented in other graphic operating systems, such as IBM's "OS/2" operating system, and the operating system used in "MACINTOSH" computers manufactured by Apple Computer, Inc. Those skilled in the art will understand that a graphic operating system enables the user to select and manipulate objects using the mouse 80 or other suitable pointing device, thereby minimizing the amount of alphanumeric input the user is required to input via the keyboard 75.

In the preferred operating system, when the user moves the mouse 80, the operating system moves a small, bit-mapped icon called the mouse cursor on the display. The mouse cursor may be displayed as any of a variety of icons, which are selected according to operation being conducted. The mouse cursor has a single-pixel hot spot that corresponds to a precise location on the display. The standard mouse operations include the following:

Clicking—pressing and releasing a mouse button.

Double—clicking pressing and releasing a mouse button twice in quick succession.

Dragging—moving the mouse while holding down a button.

Typically, a graphic operating system provides icons or objects that can be selected by using the mouse to move the mouse cursor over the desired icon and clicking the appropriate mouse button. In most cases the file associated with an icon may be executed or opened by double clicking on the icon associated with the file. Icons may be moved by dragging them to the desired location.

FIG. 3 is simplified block diagram illustrating the interaction between the computer hardware 85, the operating system 90, and an application program 95.

When the computer is turned on, the CPU fetches instructions from the ROM. These instructions perform a power on self test and load the basic input output system (BIOS), which controls the most basic level of communications between the CPU and the peripheral devices. The CPU then loads the operating system into RAM and runs the operating system.

The operating system (in conjunction with the BIOS and device drivers) provides the basic interface between the computer's resources, the user, and the application program. The operating system interprets and carries out instructions issued by the user. For example, when the user wants to load an application program, the operating system interprets the instruction (e.g., double clicking on the application program's icon) and causes the hard drive to load the program into RAM. Once the application program is loaded into RAM, it is executed by the CPU. In case of large programs, CPU loads various portions of program into RAM as needed.

The operating system also provides a variety of functions or services that allow application program to easily deal with various types of input/output (I/O). This allows an application program to issue relatively simple function calls that cause the operating system to perform all of the steps required to accomplish various tasks.

The operating system communicates with the application program by sending input and window-management messages to the application program. A "window procedure" in the application program then responds to messages received from the operating system. The window procedures must examine each message from the operating system. At that point, the window procedure carries out some specific action based on the message, or passes the message back to the operating system for default processing.

The preferred embodiment of the present invention is the "MICROSOFT ACCESS" database application program, version 2.0, which is published by Microsoft Corporation. Briefly described, the preferred application program is an interactive relational database management system for the "WINDOWS" operating system. The preferred application program is graphical, and takes advantage of the graphical power of the "WINDOWS" operating system. This gives the user visual access to the data, and simple, direct ways to view and manipulate information.

In the preferred application program, data is stored in tables, and may be viewed and manipulated using forms and reports. A table is a collection of data about a particular subject. The data is presented in columns (called fields) and rows (called records). All of the data in a table describes the subject of the table. For example, one table might store data about a user's products, another about the user's customers, and a third about the user's suppliers.

In a table, a field is a category of information, such as a company name, address, etc. A record is a collection of information about one person, thing, or event. Each record in a table contains the same set of fields, and each field contains the same type of information for each record.

A form is an object that is generally used to enter, change, and view records of data in a custom layout. In some cases, a form may include buttons that are used to launch other forms. The user specifies how the data is displayed when the form is designed. The preferred application program allows the user to create custom forms by allowing free form placement of objects corresponding to various types of data. A report is similar to a form, and allows a user to print the data in a custom layout.

The items on a form or report are called objects or controls. These allow a user to display data from a field, the results of a calculation, words for a title or message, or a graph, picture or other object. Some of the objects contain data (e.g., text boxes, labels, etc.). Other types of objects do not contain data (e.g., lines, rectangles, etc.). The present invention is used primarily in selecting the free form objects that are used to create forms and reports.

In the context of the present invention, the primary interaction between the preferred application program and the operating system involves mouse-related and cursor-related functions and messages. As will be described more completely below, the application program receives mouse coordinates and mouse button status from the operating system. When the mouse cursor is moved into a predetermined selection identification zone of a window, the application program causes the operating system to change the mouse cursor to a fight-pointing or downward-pointing arrow in order to indicate that objects may be selected. The primary operating system messages and function calls involved in this process are discussed below.

A window procedure receives mouse messages from the operating system whenever the mouse cursor passes over the window or a mouse button is clicked within a window. The operating system posts a WM_MOUSEMOVE message to the appropriate application program when the cursor is moved over the "client area" of a window. When the user presses or releases the left mouse button while the cursor is in the client area, the operating system posts a WM_LBUTTONDOWN or WM_LBUTTONUP message to the window.

The WM_MOUSEMOVE, WM_LBUTTONDOWN, and WM_LBUTTONUP messages each include two parameters known as lParam and wParam. The lParam parameter indicates the position of the mouse cursor. The low order word of the lParam indicates the x-coordinate, and the high-order word of the lParam indicates the y-coordinate. The coordinates are given in "client coordinates", where the position is relative to the upper left corner of the client area of the window. The wParam parameter contains flags that indicate the state of the mouse buttons and the SHIFT and CNTRL keys. These can be checked when mouse message processing depends on the state of another mouse button or of the SHIFT and CNTRL keys.

Normally, the operating system posts a mouse message to the window that contains the cursor at the time a mouse event occurs. However, an application program may "capture the mouse" in order to ensure that it continues to receive mouse messages even when the mouse is outside the window's client area. An application program may capture the mouse by calling the SETCAPTURE function provided by the "WINDOWS" operating system. Likewise, an application program releases the mouse by calling the RELEASECAPTURE function.

The "WINDOWS" operating system also allows an application program to change the icon that is associated with the mouse cursor. This is accomplished by calling the SETCURSOR function and providing the appropriate parameters.

At this point, it should be appreciated that operating systems such as the "WINDOWS" operating system are quite complex and provide a wide variety of services that allow users and application programs to utilize the resources available in the personal computer. Those skilled in the art will be familiar with operating systems and their various features, which include, but are in no means limited to the specific messages and functions described above. For more comprehensive information regarding the "WINDOWS" operating system and its interaction with application programs, the reader may refer to any of a variety of publications, including the Guide to Programming, which is part of the Microsoft Windows Software Development Kit (published by Microsoft), the Win32 Programmer's Reference (published by Microsoft Press), and Programming Windows 3.1 (published by Microsoft Press), all of which are incorporated herein by reference.

Likewise, those skilled in the art will appreciate that the preferred application program, sold under the trademark "MICROSOFT ACCESS", provides a wide variety of features and functions in addition to those included the brief description presented above. For additional information regarding the "MICROSOFT ACCESS" application program, the reader may refer to the documentation that is distributed with Version 2.0 of the application program. This documentation is incorporated herein by reference.

The Preferred Methods For Selecting Objects From A Ruler

Figure 5A:
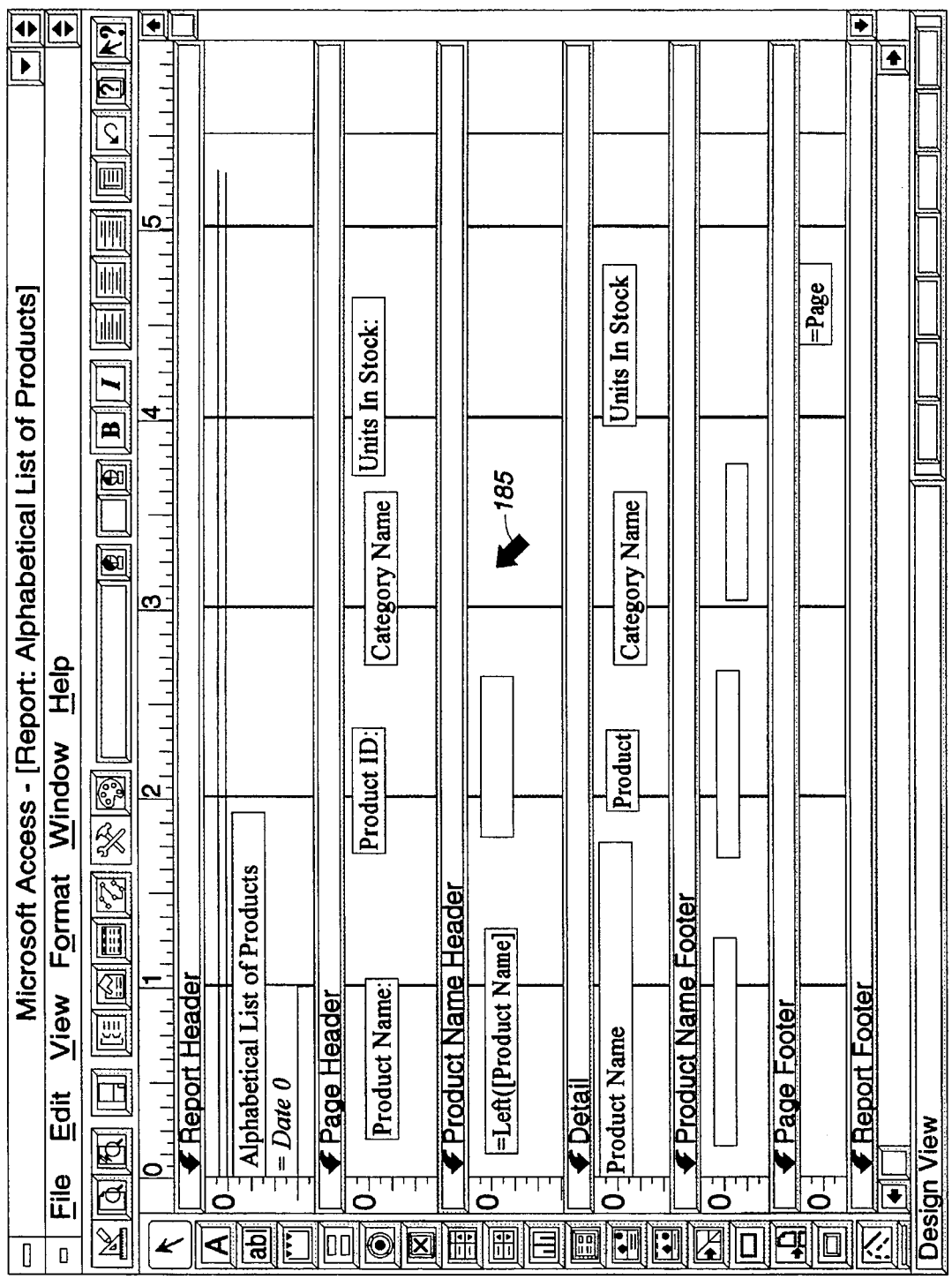
FIGS. 5A–5E are screen displays illustrating the preferred method for selecting adjacent objects that intersect a selection region.
Figure 5B:
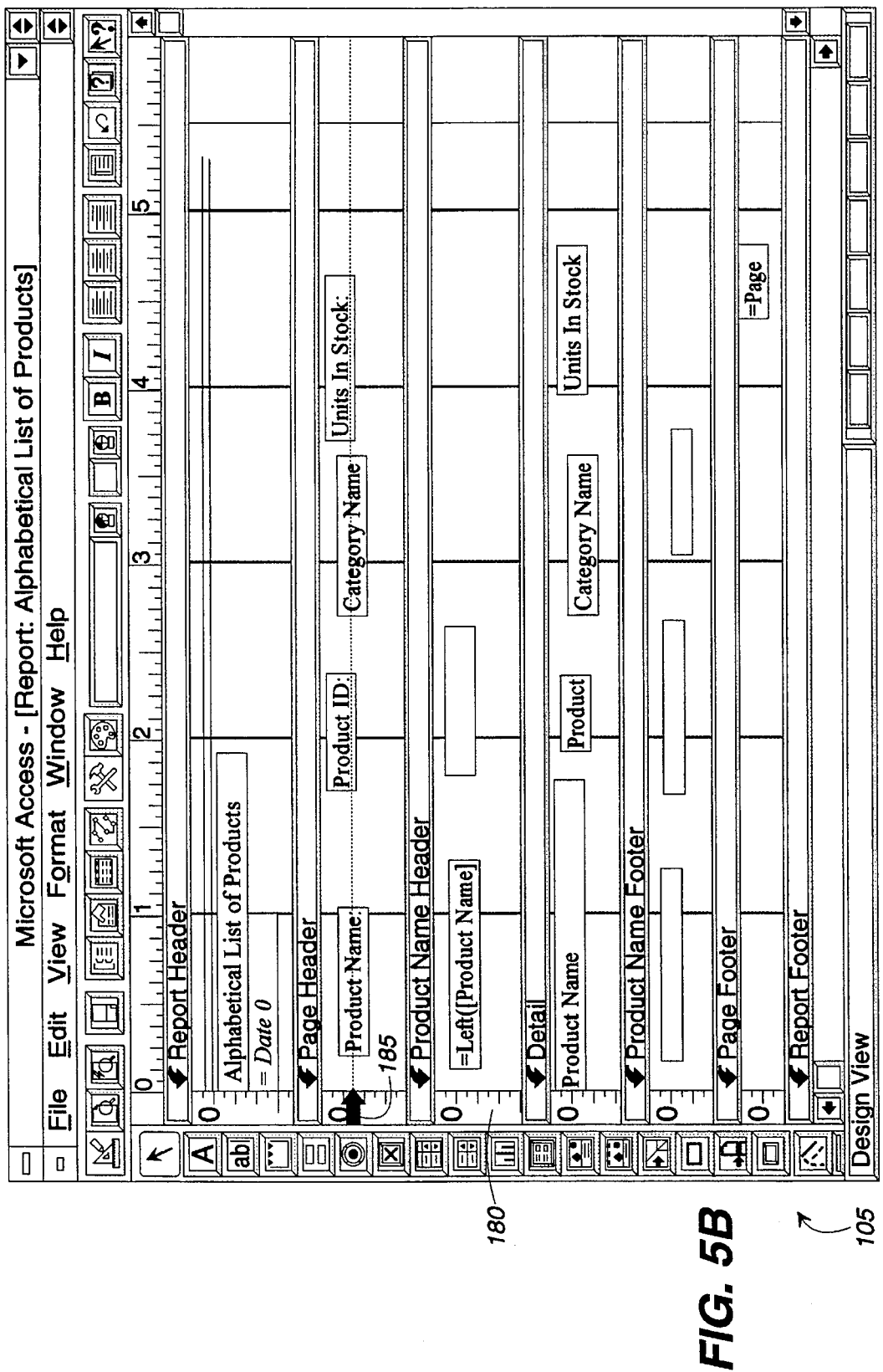
Figure 5C:
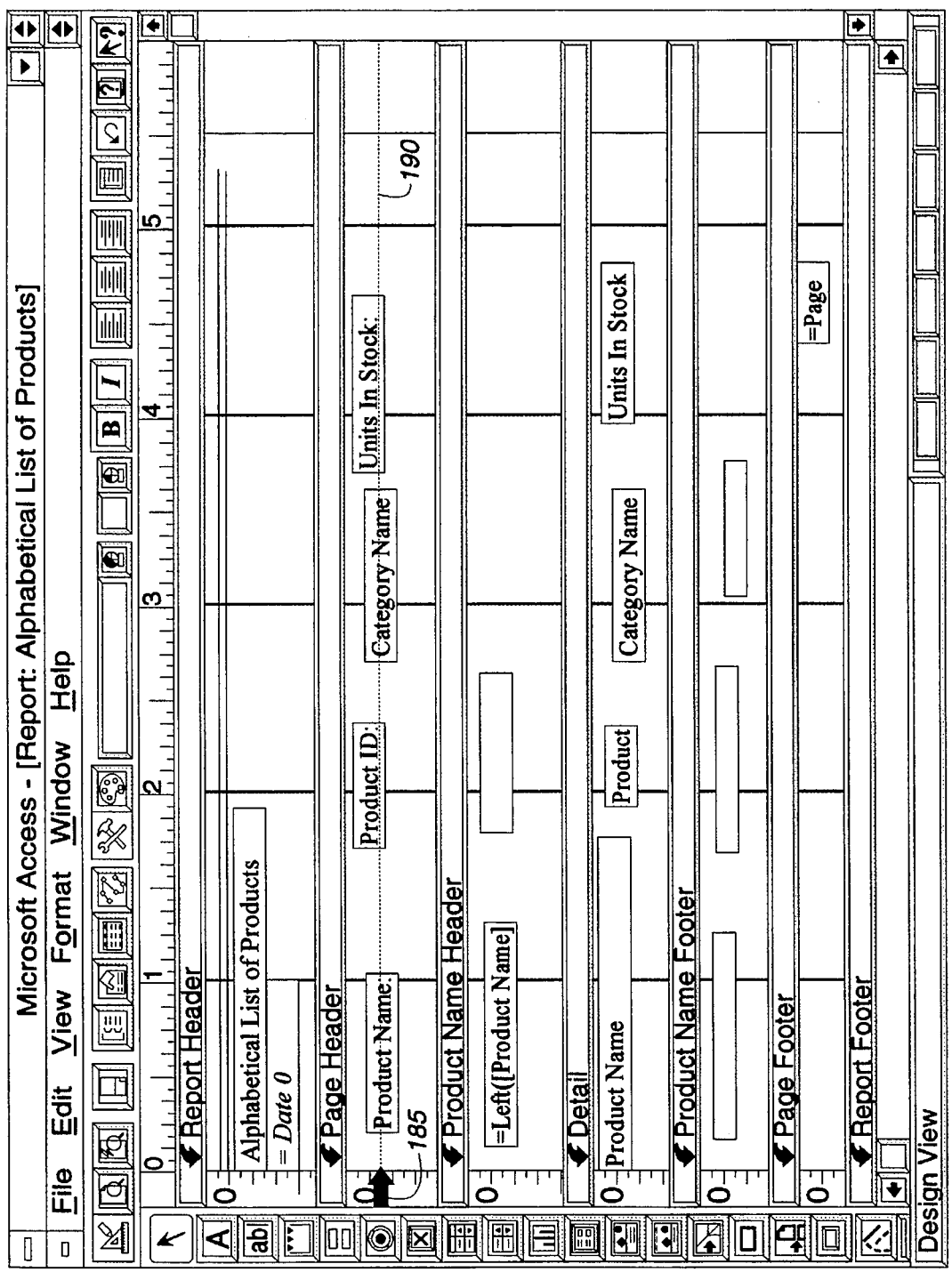
Figure 5D:
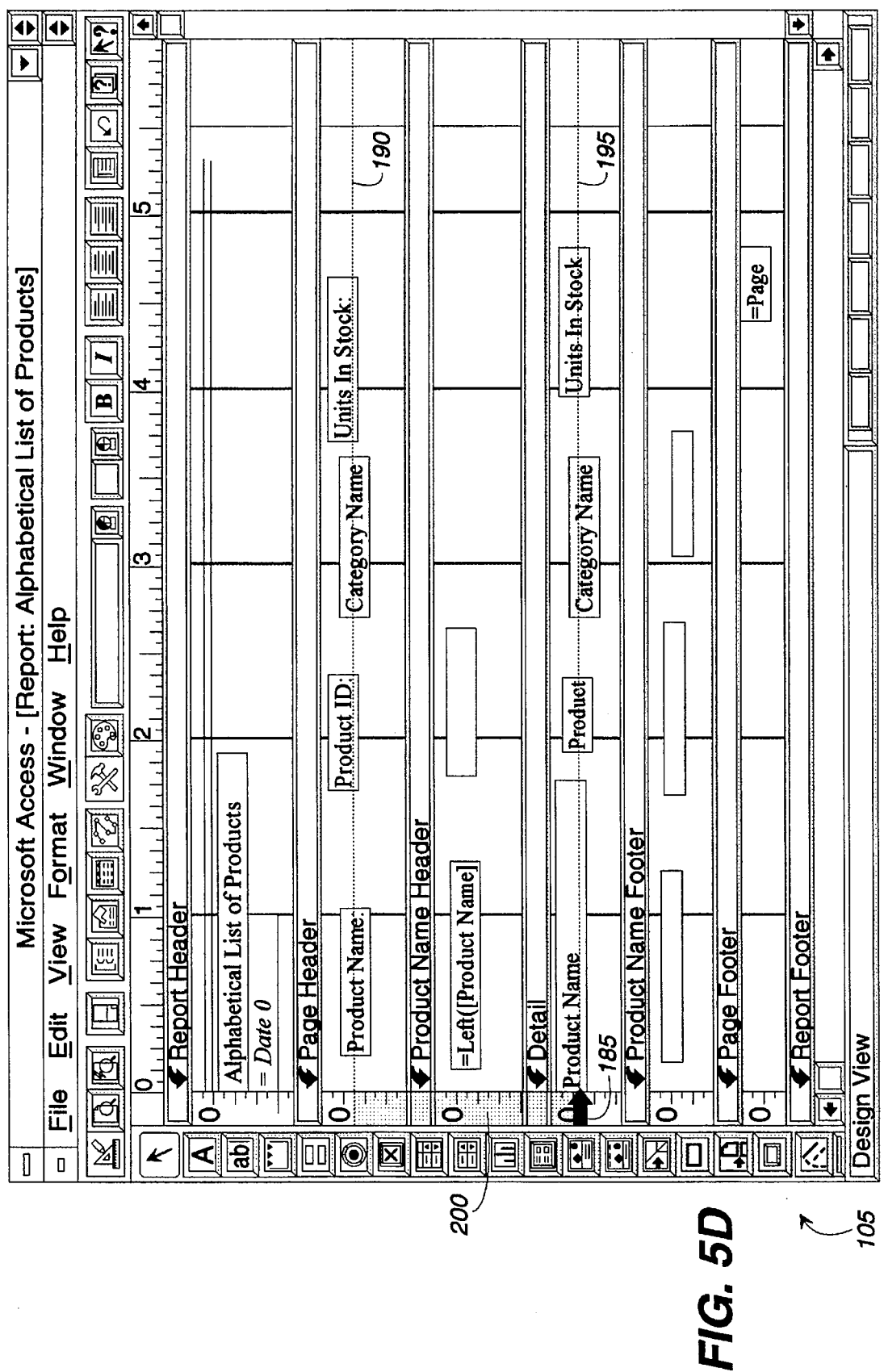
Figure 5E:
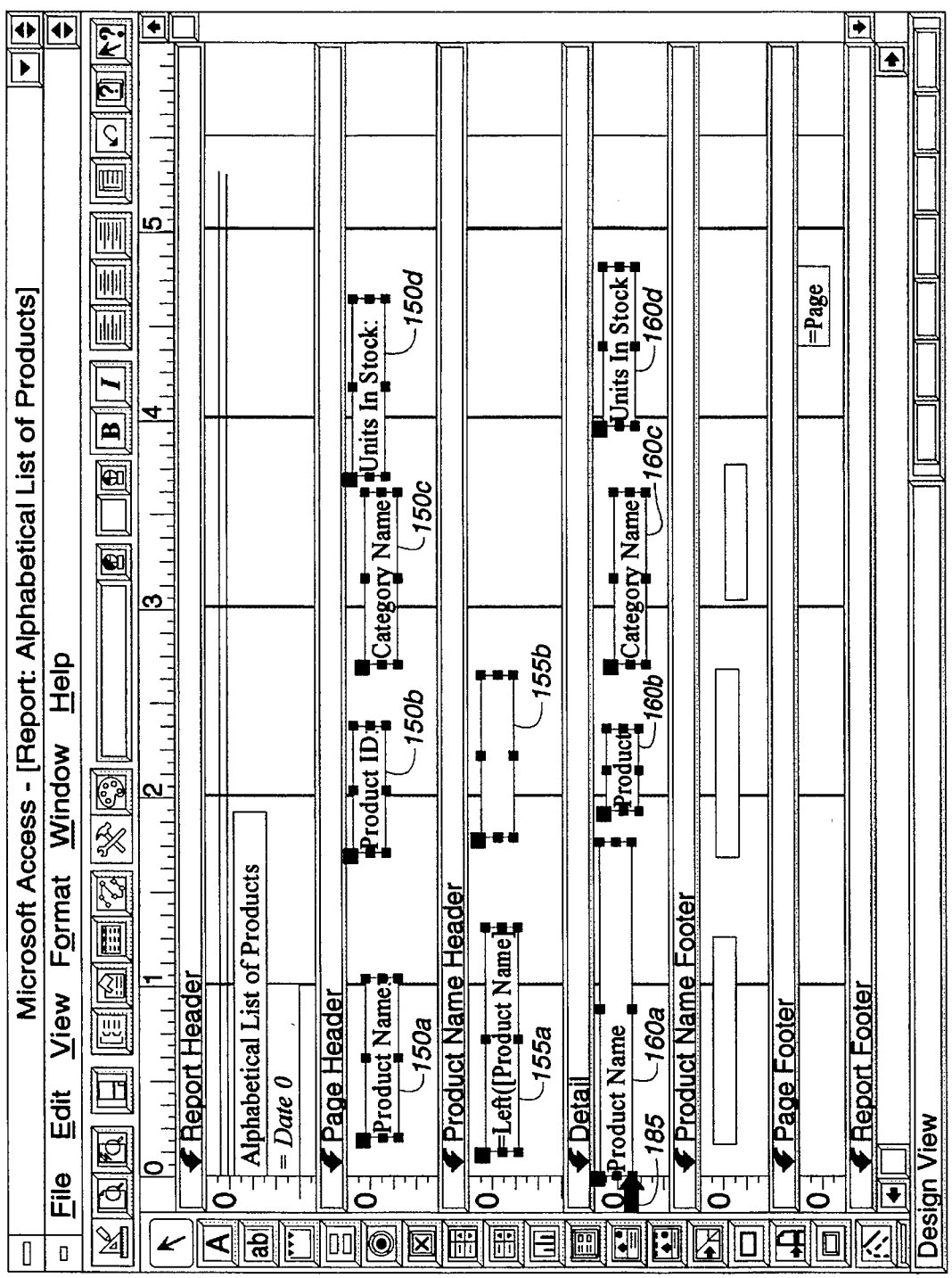
Figure 6A:
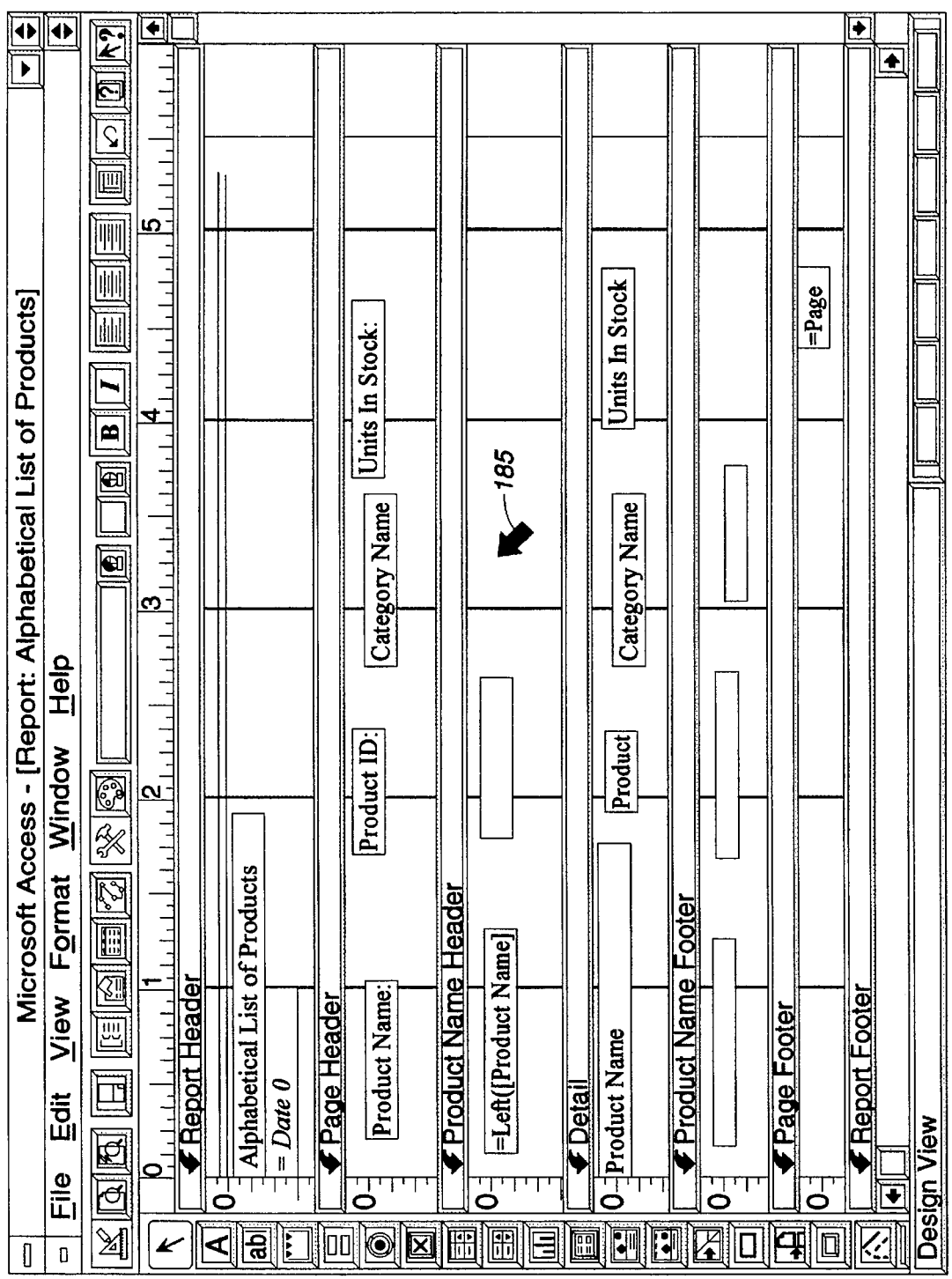
FIGS. 6A–6H are screen displays illustrating the preferred method for selecting non-adjacent objects that intersect a selection line and a separate selection region.
Figure 6B:
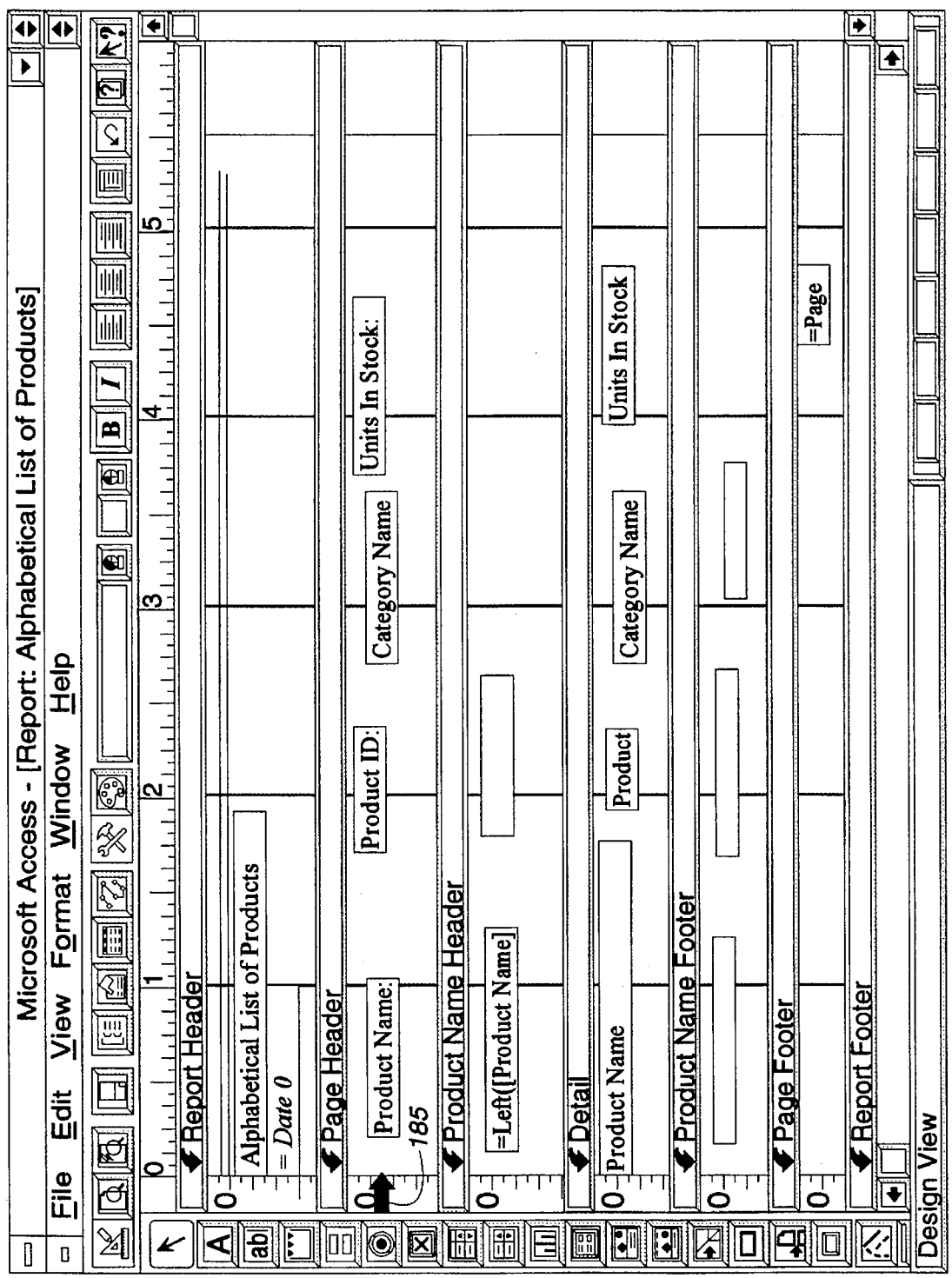
Figure 6C:
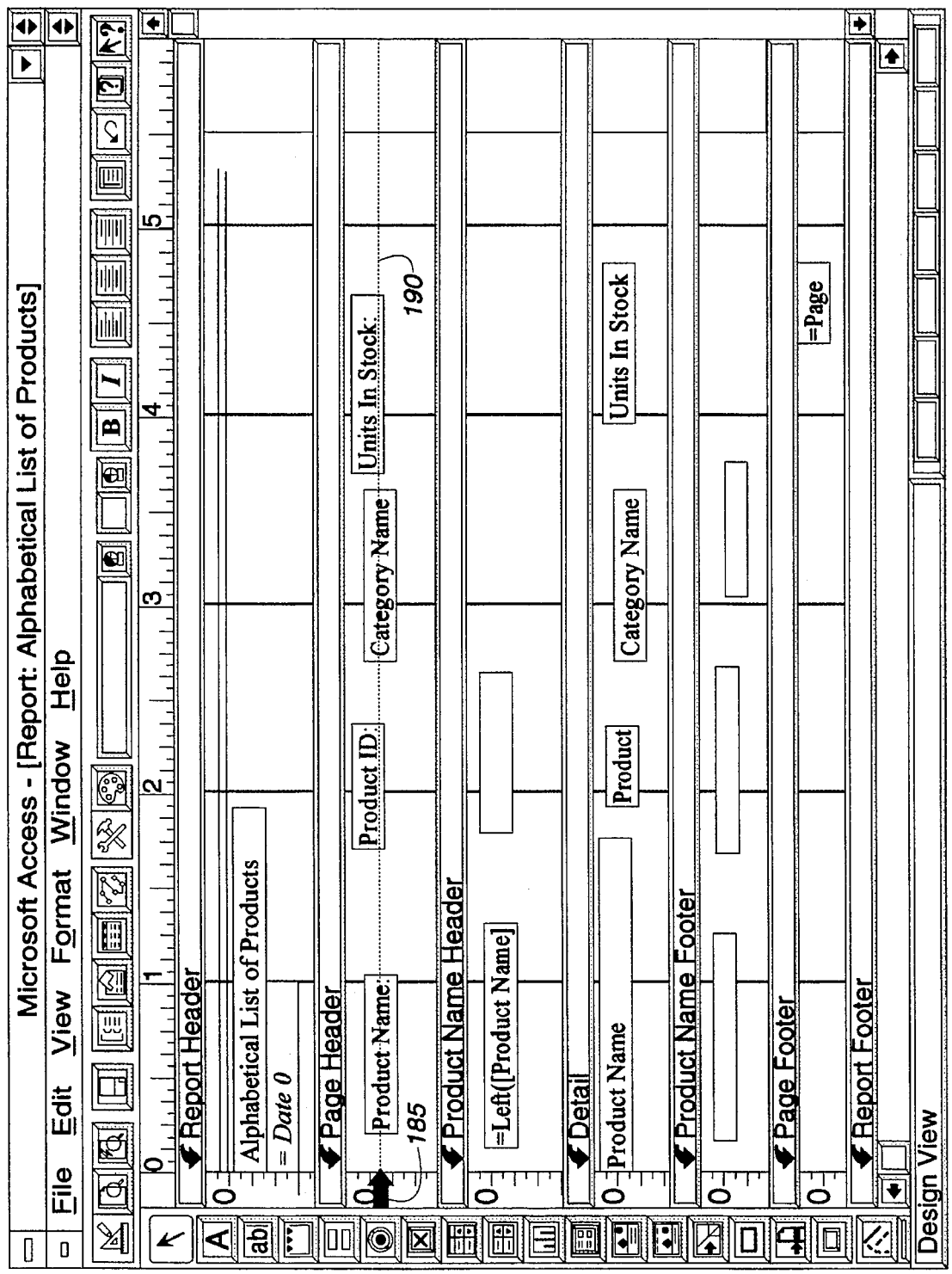
Figure 6D:
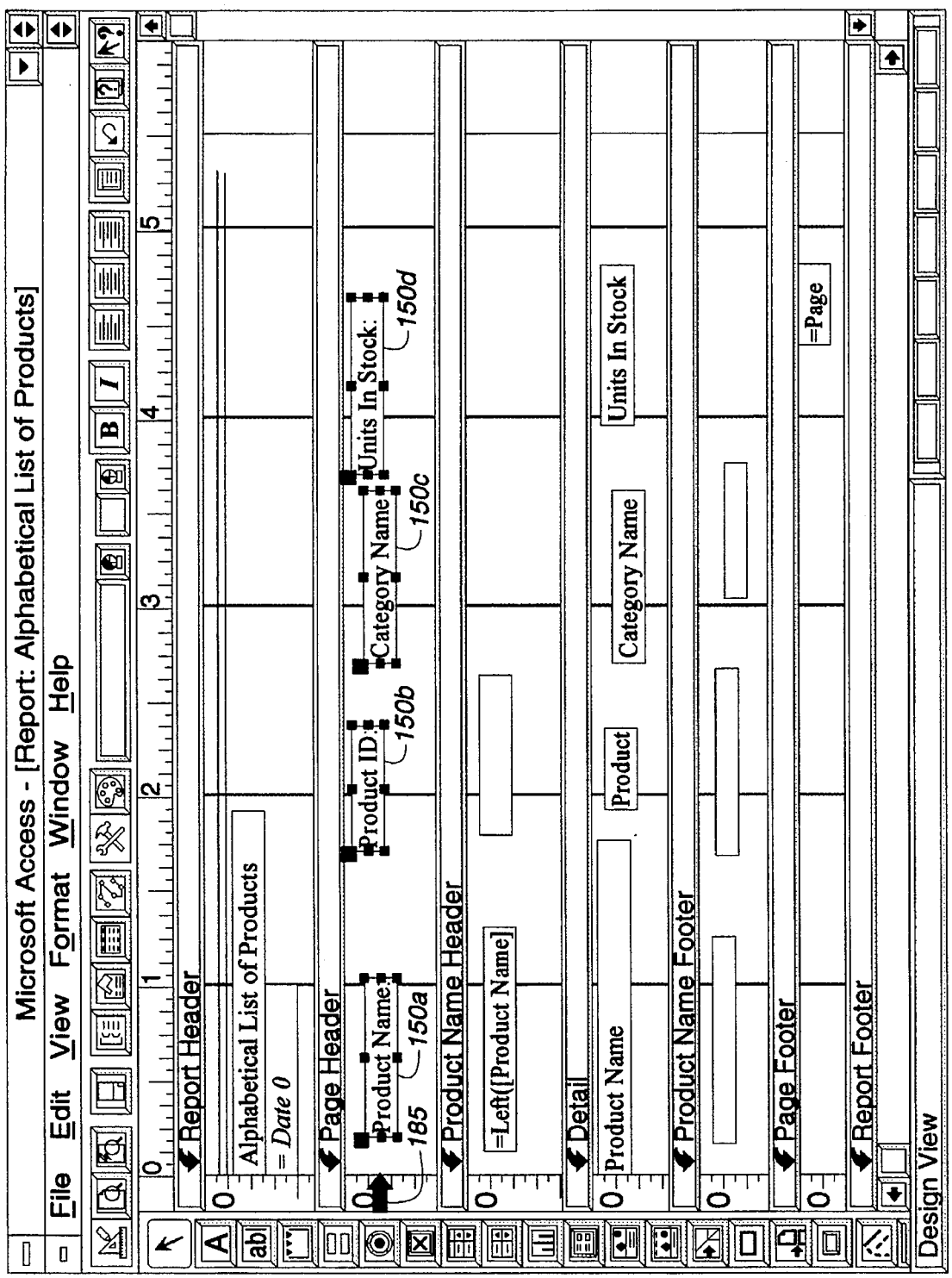
Figure 6E:
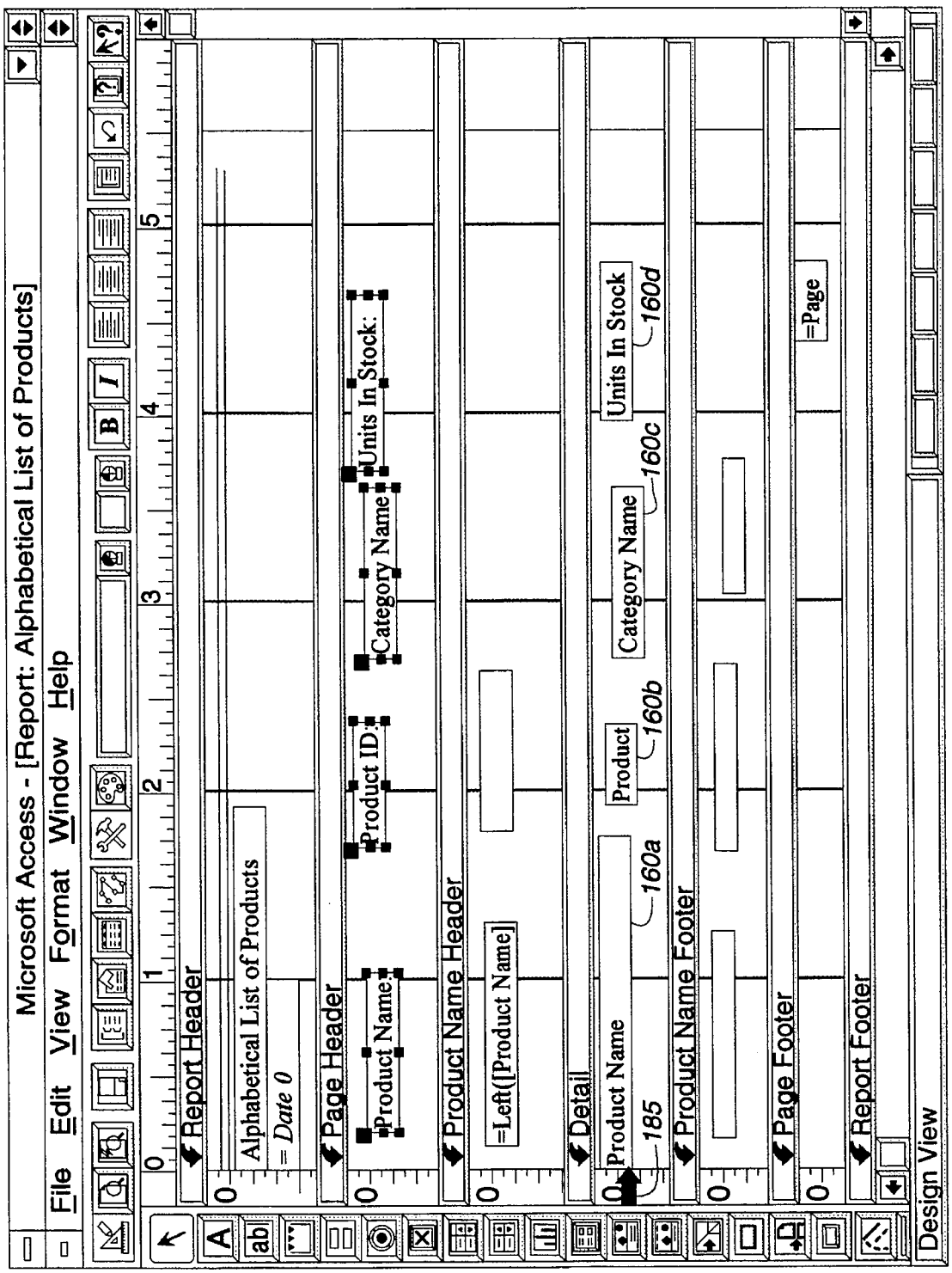
Figure 6F:
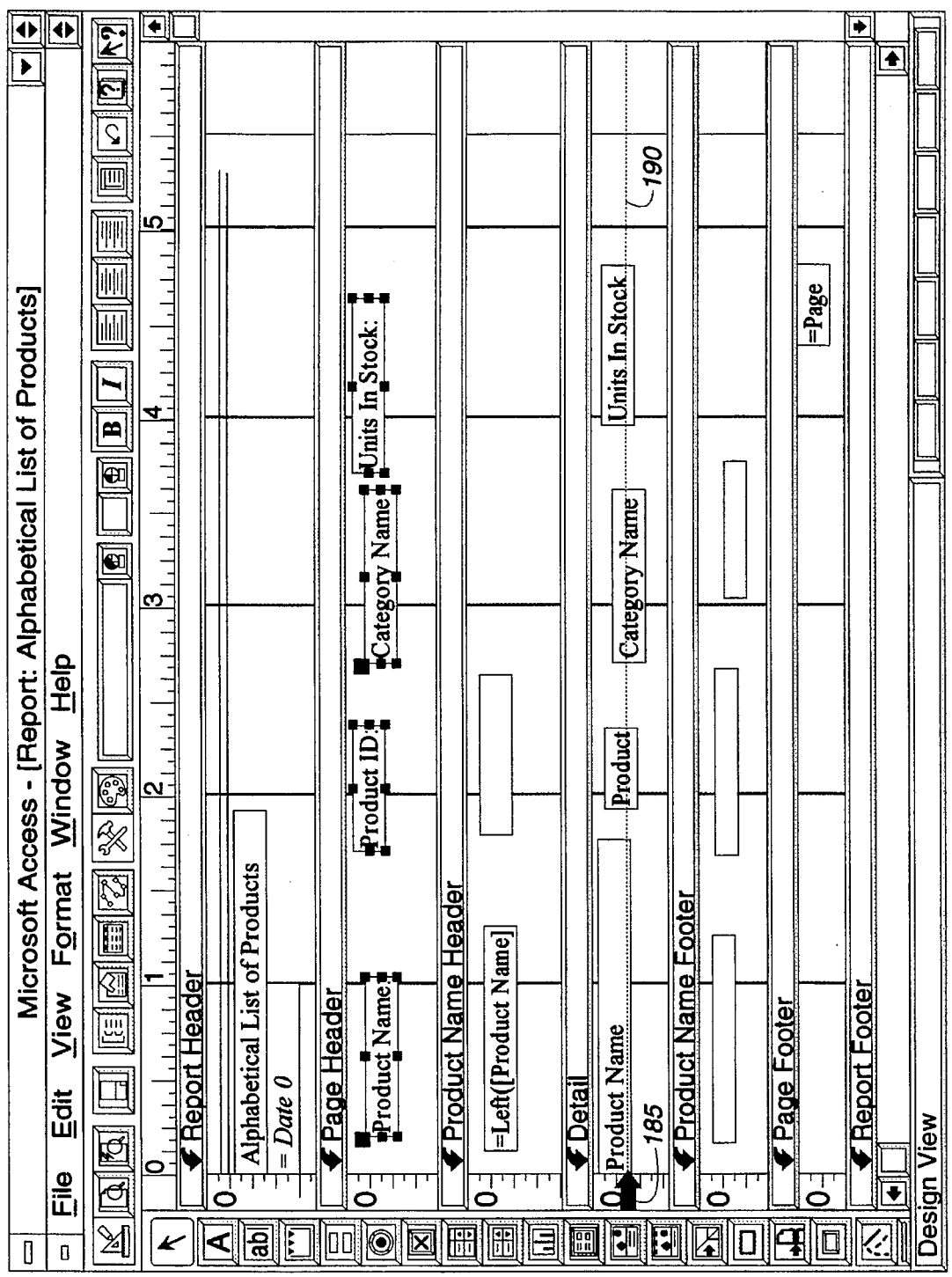
Figure 6G:
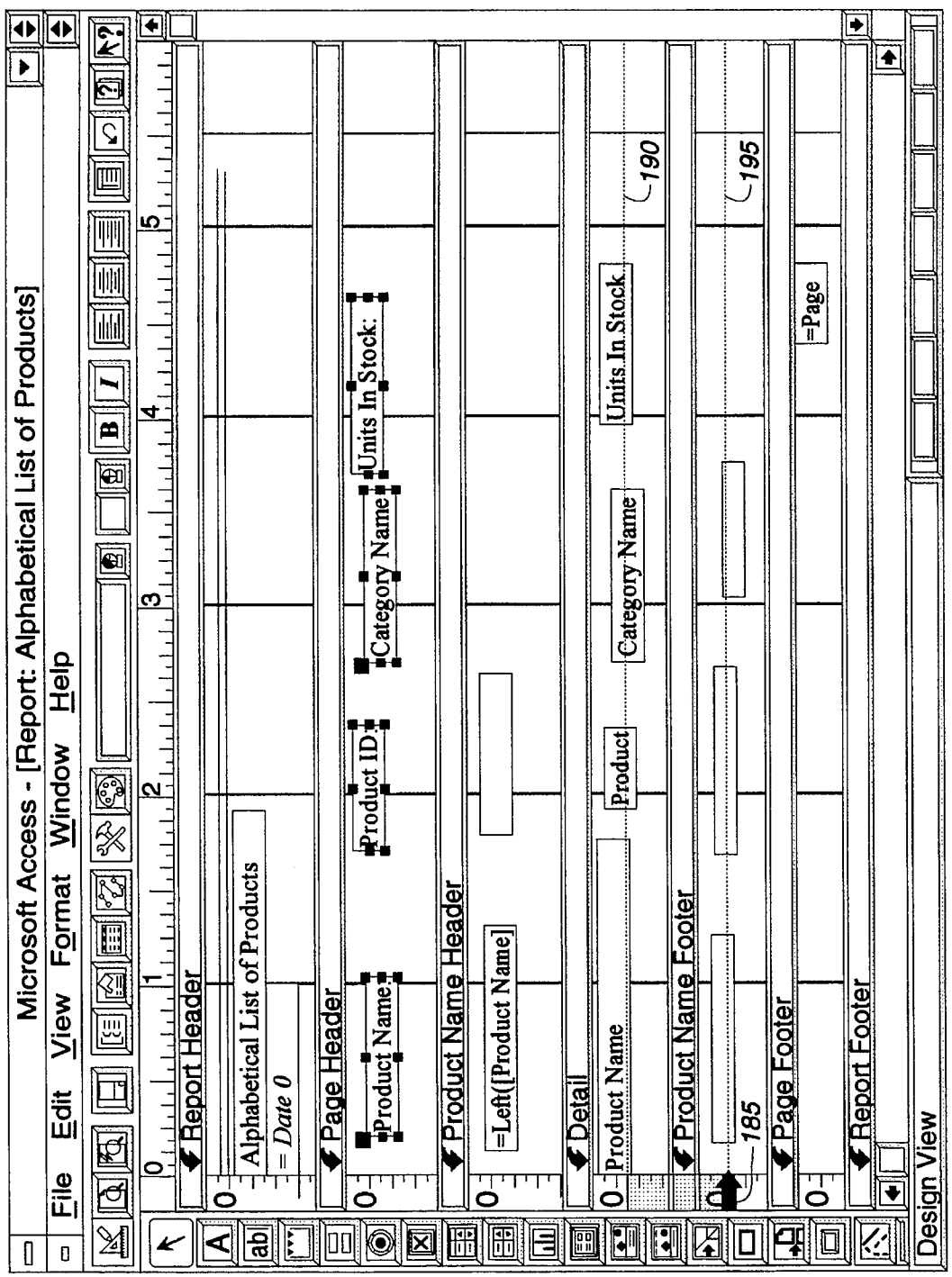
Figure 6H:
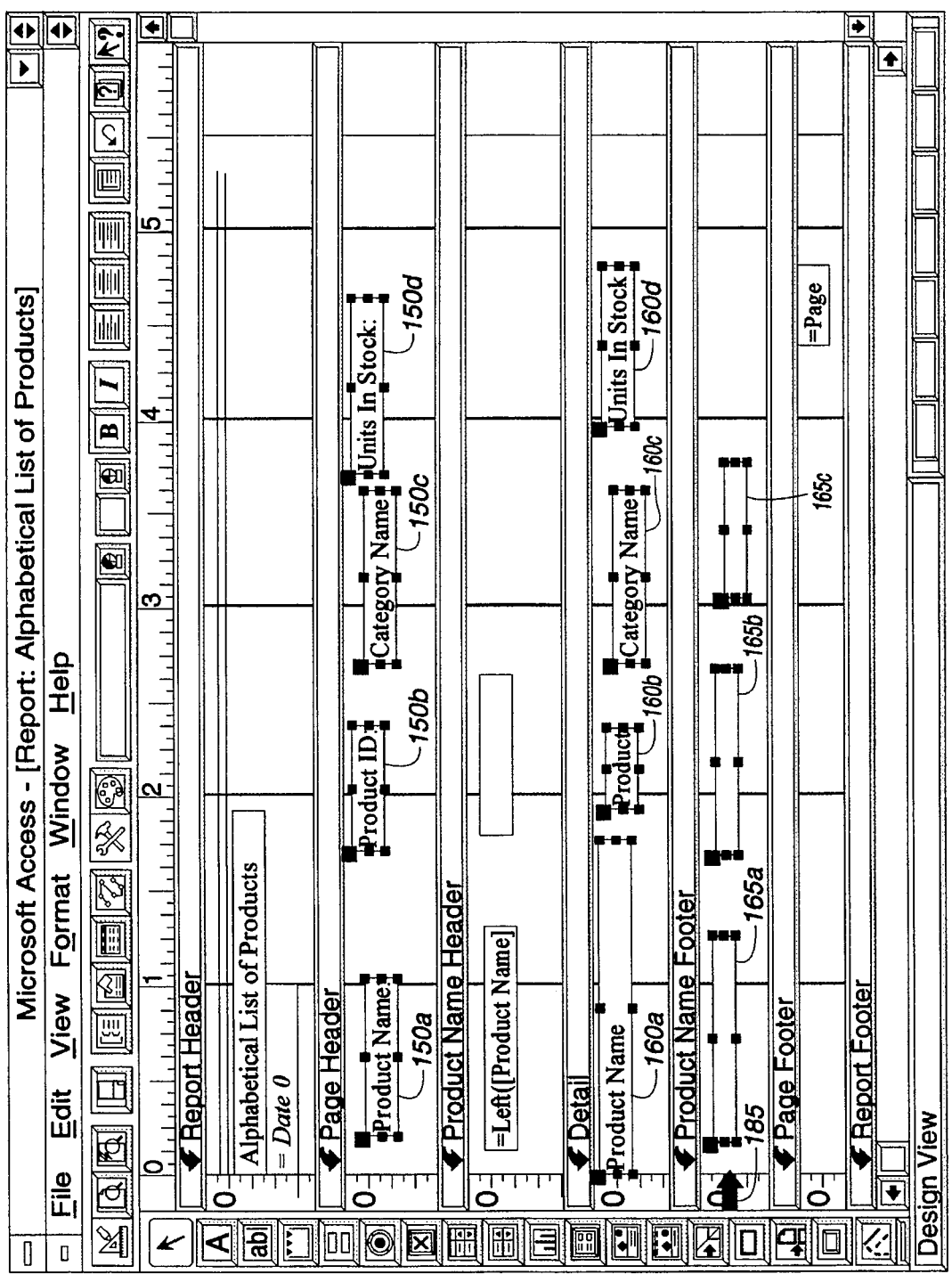
Figure 7:
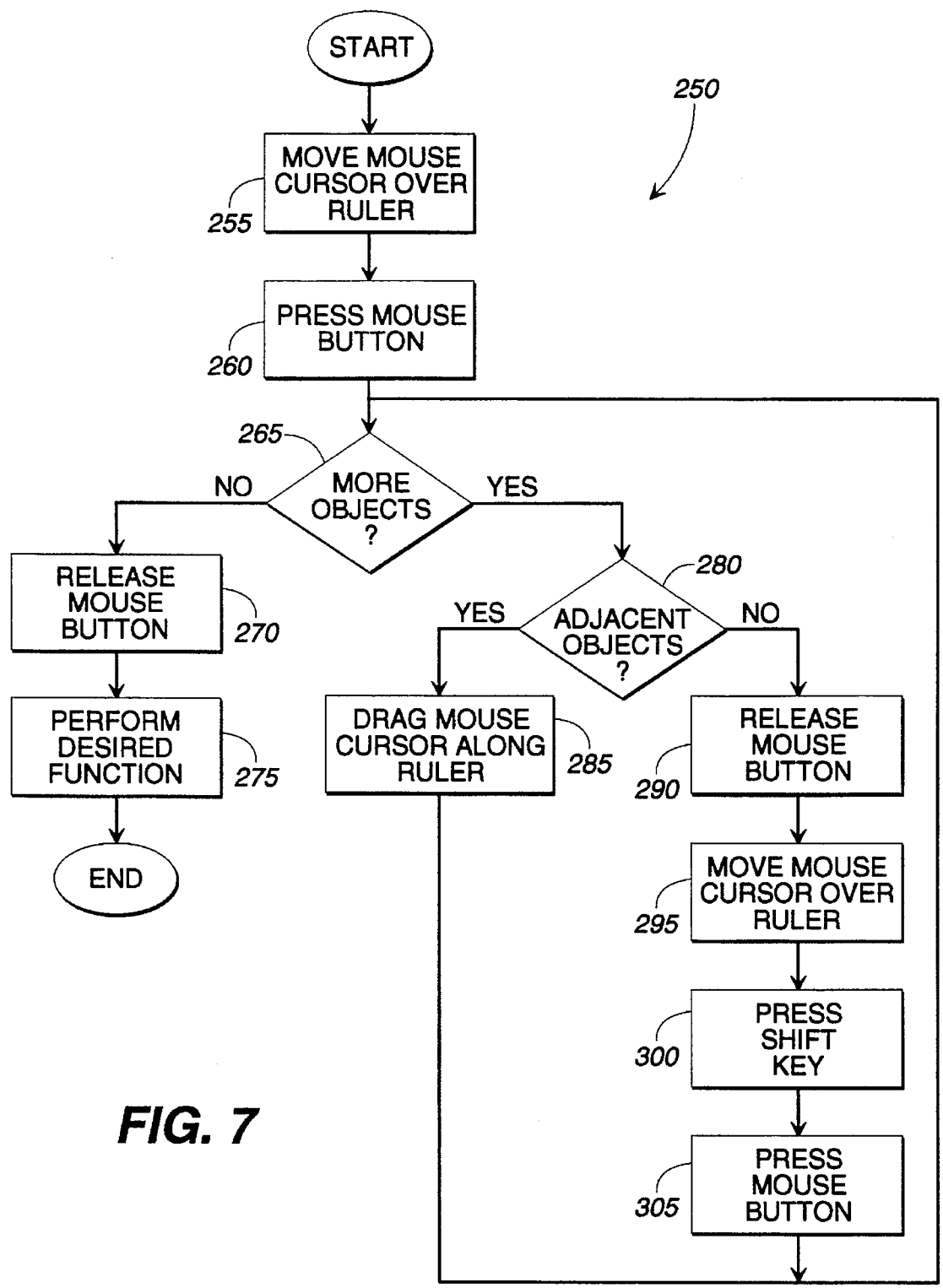
FIG. 7 is a flow diagram illustrating the method of the present invention as perceived by a user.
Figure 8:
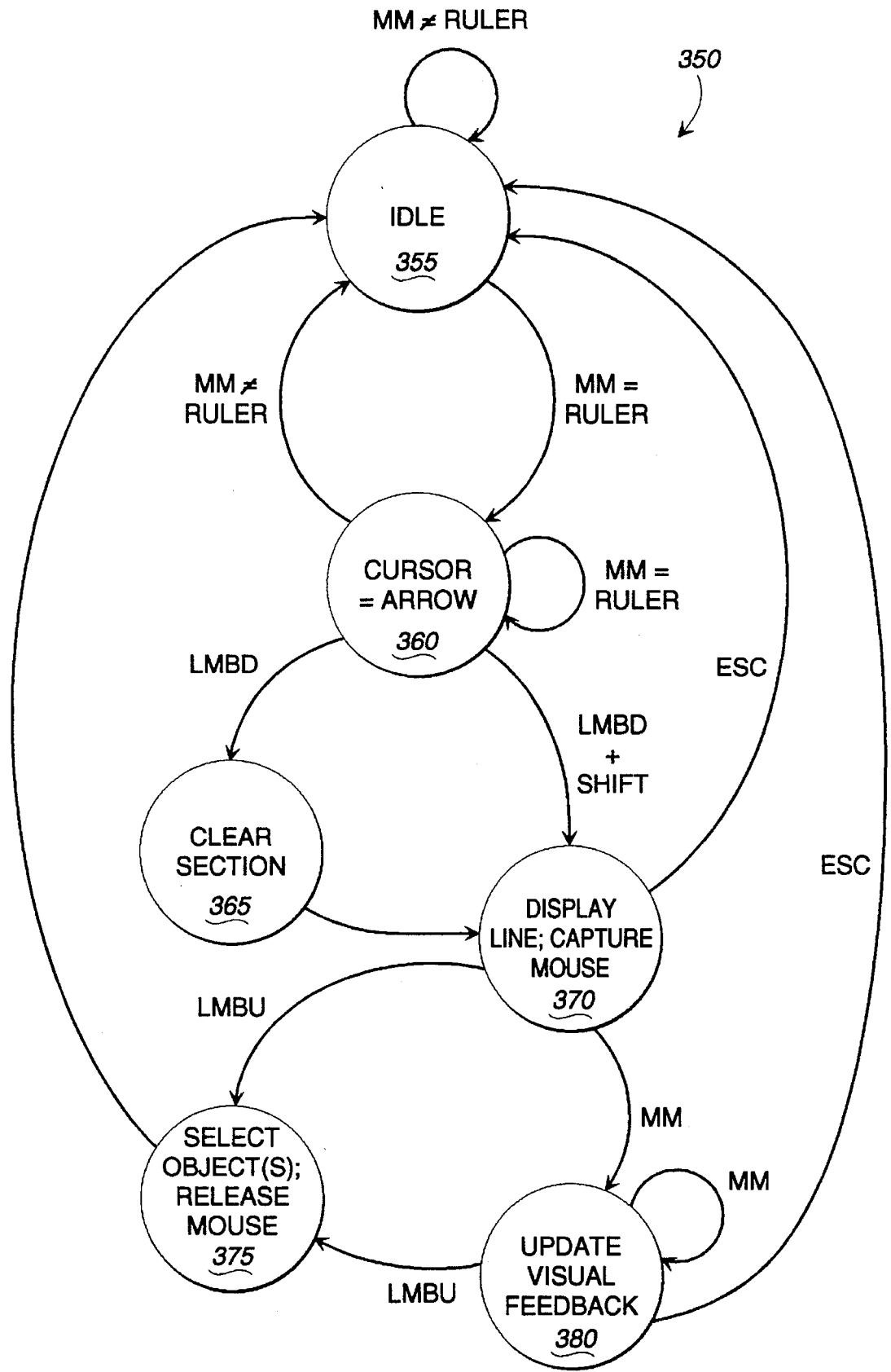
FIG. 8 is a state diagram illustrating the method of present invention as implemented by an application program running on a personal computer.

Turning now to FIGS. 4–8, the preferred method for selecting objects from a ruler will be described. FIGS. 4–6 provide printouts of screen displays illustrating variations in the method of the present invention. FIGS. 4A–4D illustrate the preferred method for selecting objects that intersect a single selection line. FIGS. 5A–5E illustrate the preferred method for selecting objects that intersect a selection region bounded by two lines. FIGS. 6A–6H illustrate the preferred method for selecting non-adjacent groups of objects that intersect a selection line and a separate selection region. FIG. 7 is a flow diagram illustrating the steps taken by the user in order to select objects using the method of the present invention. FIG. 8 is a state diagram illustrating the method of present invention as implemented by an application program running on a personal computer.

FIGS. 4A–4D, 5A–5E, and FIGS. 6A–6H (collectively referred to as "the screen printouts") show a window 105 associated with the preferred application program. In particular, the screen printouts show a report entitled "Alphabetical List of Products" in design view. The report includes a variety of objects that are arranged to provide a custom report pertaining to product information stored in a database. Design view allows the user to edit the report by adding, deleting, moving or editing objects.

Those skilled in the art will be familiar with most of the elements shown in the screen printouts. A menu bar 110, which includes a variety of pull down menus 112, is displayed along the top edge of the window 105. A vertical scroll bar 115 and horizontal scroll bar 120 are positioned along the right and bottom edges, respectively, of the window 105. Restore boxes 125 and a minimize box 127 are positioned at the top right corner of the window 105. Control menu boxes 130 are located at the top left corner of the window 105.

The preferred application program also provides tool bars. A main tool bar 135 is displayed immediately below the menu bar 110. A secondary tool bar 140 is displayed along the left edge of the window 105. The report is divided into several sections, including headers, footers, and a detailed section. Each section includes at least one object 145a–c, 150a–d, 155a, b, 160a–d, 165a–c, and 170. The objects include labels, text boxes, lines, etc.

The window 105 provides two selection identification zones. The first selection identification zone is the horizontal ruler 175, which is located immediately below the main tool bar 135. The second selection identification zone is the vertical ruler 180, which is located immediately to the fight of the secondary tool bar 140. A selection indicator such as a standard mouse cursor 185 is also located in the window 105.

Figure 4A:
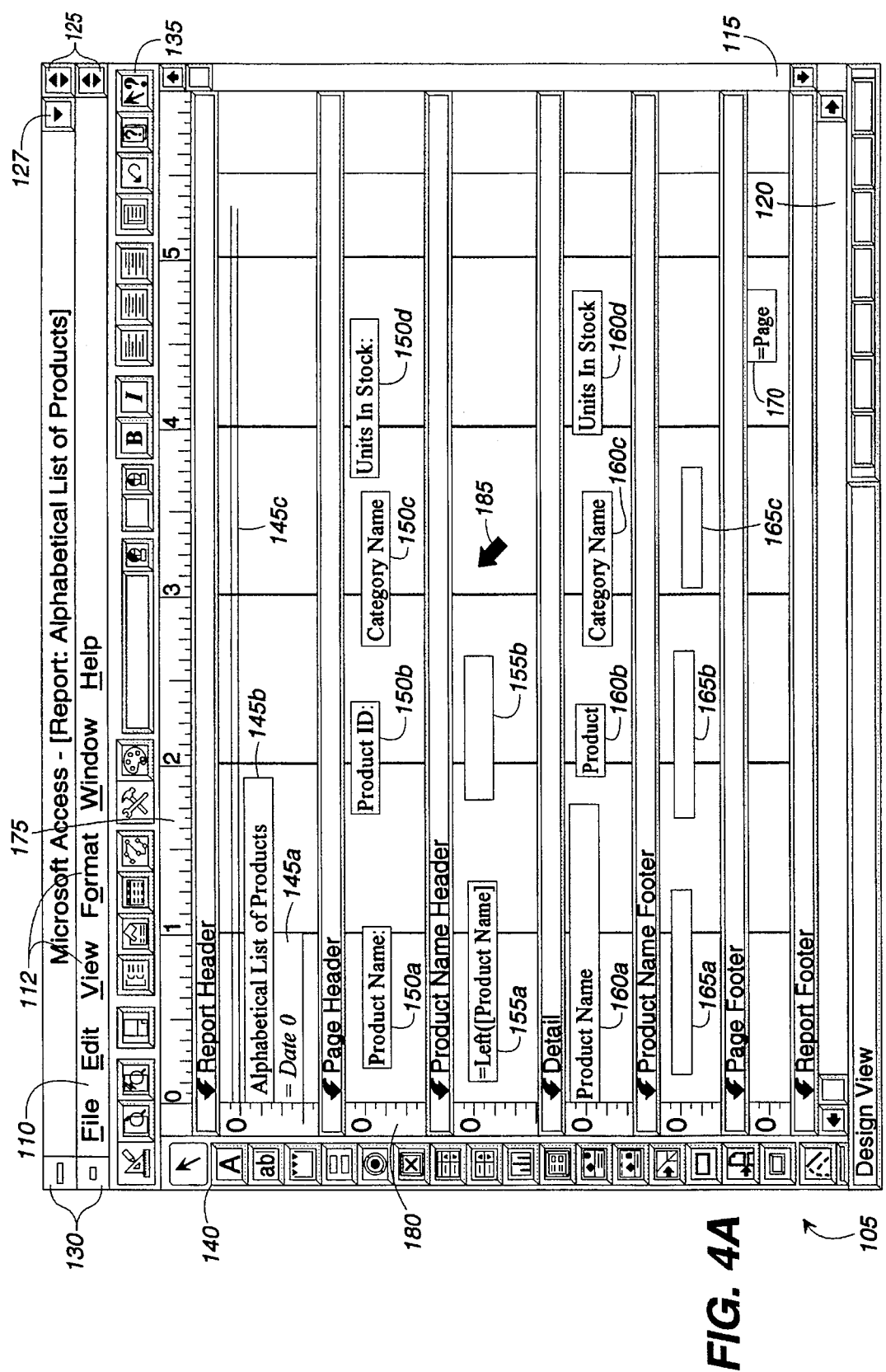
FIGS. 4A–4D are screen displays illustrating the preferred method for selecting objects that intersect a single selection line.
Figure 4B:
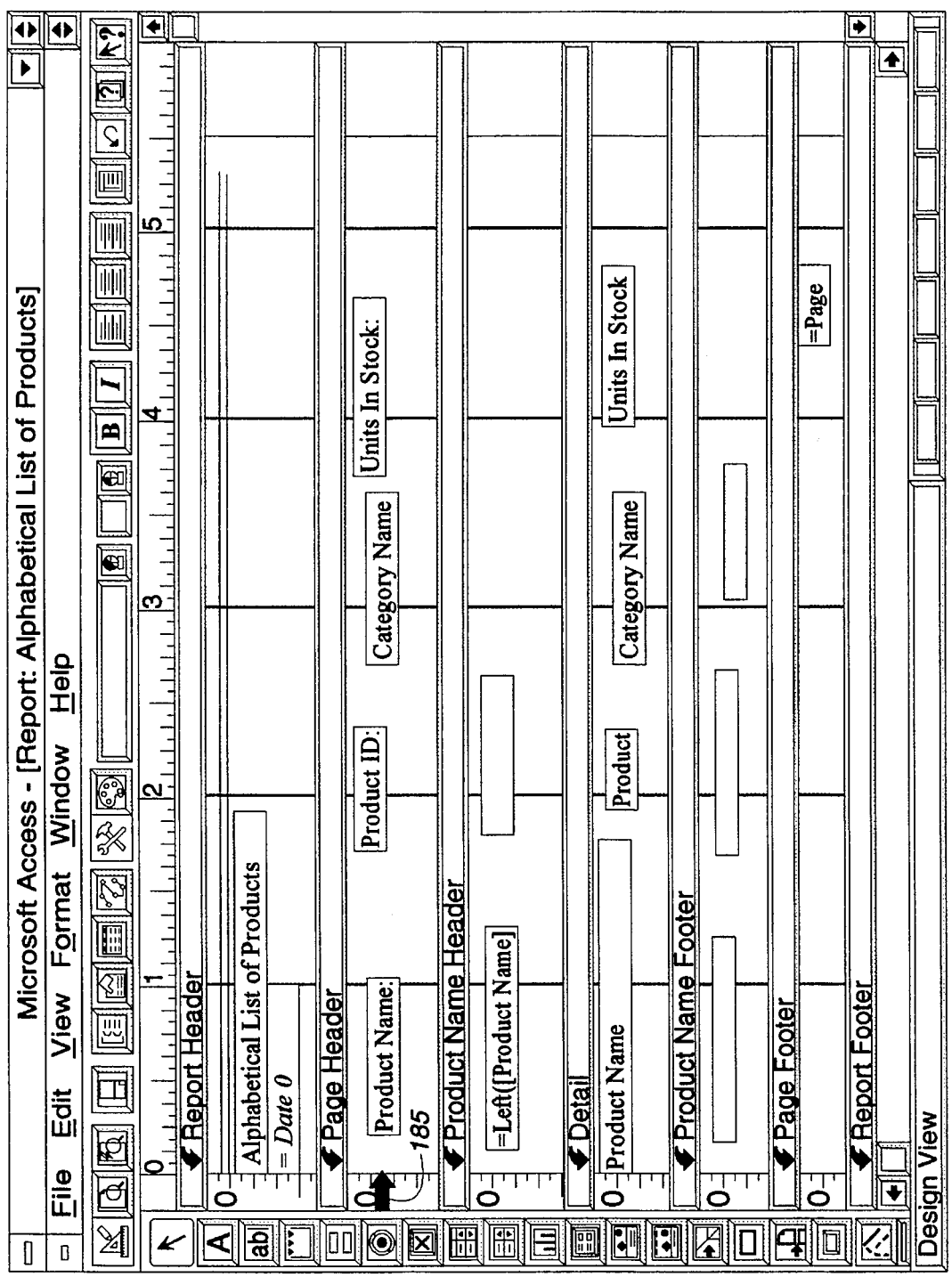
Figure 4C:
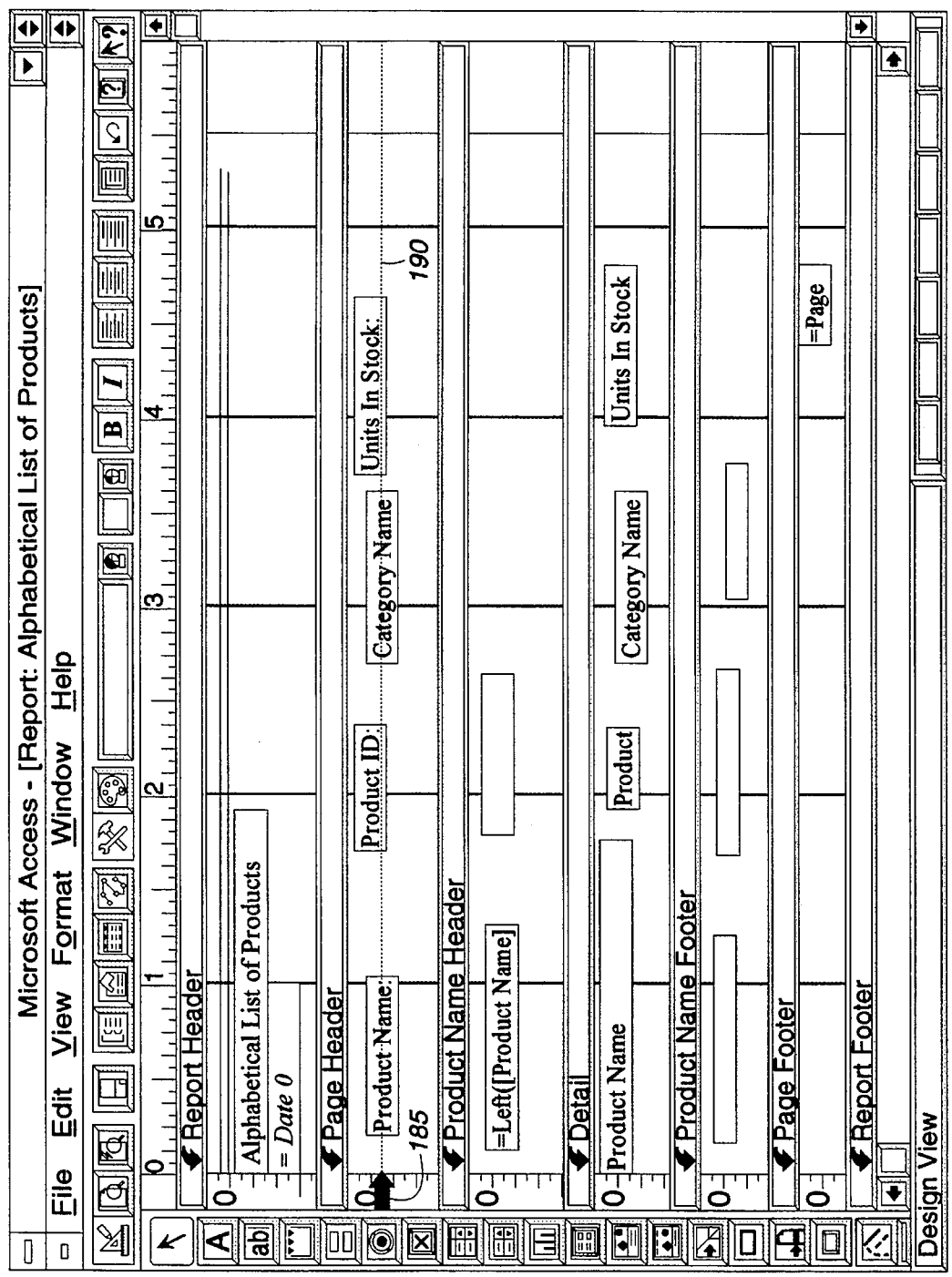

Referring now to FIGS. 4A–4C, the first method of the present invention will be described. Generally described, the first method of the present invention allows the user to select all of the objects that lie along a horizontal or vertical line by moving the mouse cursor over the appropriate ruler and clicking the mouse button. Each of the steps involved in this process is illustrated in the view of FIGS. 4A–4D.

In the view of FIG. 4A, a plurality of objects have been placed in an area that includes the various sections of the window 105. None of the objects has been "selected" for editing at this point, and the mouse cursor 185 is positioned inside the window 105, but not over either of the rulers 175, 180.

In order to select all of the objects 150a–d, which lie in the "Page Header" section, the user moves the mouse cursor 185 over the portion of the vertical ruler 180 that is adjacent the objects. As shown in FIG. 4B, when the mouse cursor 185 is moved over the ruler, the application program causes the standard mouse cursor to change to a right arrow mouse cursor, which is intended to indicate to the user that objects along a horizontal line may be selected.

The next step in the selection process is for the user to press the mouse button. FIG. 4C illustrates the visual feedback that is provided by the application program when the mouse button is pressed. When the mouse is pressed, the application program displays a horizontal selection line 190 that extends from the mouse cursor 185.

Figure 4D:
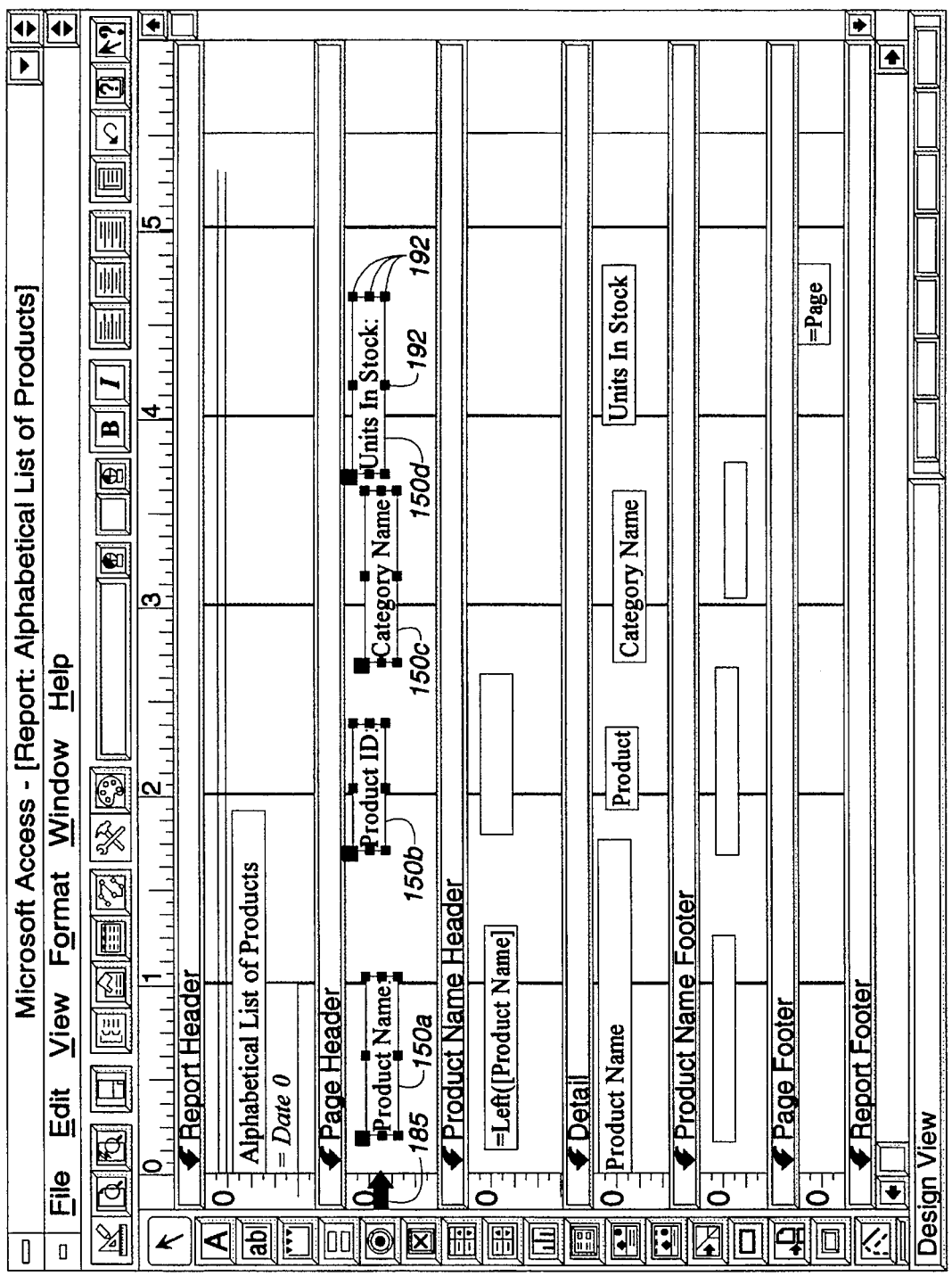

The final step in the selection process is for the user to release the mouse button. As shown in FIG. 4D, once the mouse button is released, the selection line 190 disappears and the objects are selected. Those skilled in the art will be familiar with the conventional method of indicating selected objects by showing selection handles 192 on the corners and edges of selected objects. Once the mouse button is released, the selection process is complete and all of the objects 150a–d that lie along a horizontal line extending from the mouse cursor 185 have been selected. At this point, any function may be performed simultaneously on all of the selected objects, such as aligning them, moving them, deleting them, etc.

Referring now to FIGS. 5A–5E the second method of the present invention will be described. Generally described, the second method of the present invention allows the user to select all of the objects that intersect a selection region or area that is bounded by two parallel lines. The second method is similar to the first method, except that instead of simply pressing and releasing the mouse button, the mouse is dragged along the ruler to define the second boundary of the selection region. Each of the steps involved in this process is illustrated in the view of FIGS. 5A–5E.

It will be readily apparent that the steps illustrated in FIGS. 5A–5C are identical to the steps of FIGS. 4A–4C. In FIG. 5A, none of the objects is selected, and the mouse cursor 185 is located in the window 105. In FIG. 5B, the mouse cursor 185 has been moved over the ruler 180, thus causing the mouse cursor to change to a right-pointing arrow. In FIG. 5C, the mouse button has been pressed, and the application program has caused the selection line 190 to extend from the mouse cursor.

In FIG. 5D, instead of simply releasing the mouse button, the user drags the mouse cursor 185 downward over the ruler 180. This causes a second selection line 195 to extend across the window, thereby defining the second boundary of the selection region. The application program also provides additional visual feedback in the form of a darkened area 200 along the ruler 180.

Once the desired selection region is defined by the horizontal selection lines 190, 195, the final step in the selection process is for the user to release the mouse button. As shown in FIG. 5E, once the mouse button is released, the selection lines 190, 195 disappear and the objects that intersect any portion of the selection region (i.e., the area between the two selection lines) are selected.

After the mouse button is released, the selection process is complete and all of the objects 150a–d, 155a–b, and 160a–d that intersected the rectangular selection region have been selected. At this point, any function may be performed on the selected objects, such as aligning them, moving them, deleting them, etc.

Referring now to FIGS. 6A–6H the third method of the present invention will be described. Generally described, the third method of the present invention allows the user to select non-adjacent groups of objects by holding down the SHIFT key while performing either of the methods described in conjunction with FIGS. 4 and 5. Each of the steps involved in this process is illustrated in the view of FIGS. 6A–6H.

It will be readily apparent that the steps illustrated in FIGS. 6A–6D are identical the steps of FIGS. 4A–4D and result in a row of objects 150a–d being selected. In FIG. 6A, none of the objects is selected, and the mouse cursor 185 is located in the window 105. In FIG. 6B, the mouse cursor 185 has been moved over the ruler 180, thus causing the mouse cursor to change to a right-pointing arrow. In FIG. 6C, the mouse button has been pressed, and the application program has caused the horizontal line 190 to extend from the mouse cursor. In FIG. 6D, the mouse button has been released, and the objects lying along the line 190 have been selected.

In FIG. 6E, the user begins the process of selecting a second, non-contiguous group of objects by moving the mouse cursor 185 over the vertical ruler 180 adjacent the objects 160a–d that are to be selected. In FIG. 6F, the user has pressed the mouse button while holding down the SHIFT key. This causes the application program to begin the selection process without clearing the previously selected objects 150a–d. Thus, the horizontal selection line 190 extends from the mouse cursor 185. In FIG. 6G, the user drags the mouse down along the ruler in the manner described above in conjunction with FIG. 5D, thus causing a second selection line 195 to be displayed and a rectangular selection region to be indicated.

Once the second selection region is defined by the selection lines 190, 195, the final step in the selection process is for the user to release the mouse button. As shown in FIG. 6H, once the mouse button is released, the selection lines 190, 195 disappear, and the objects that intersect any portion of the region between the two selection lines are selected, along with the 150a–d.

After the mouse button is released, the selection process is complete, and all of the objects 150a–d, 160a–d and 165a–c have been selected. At this point, any function may be performed on the selected objects, such as aligning them, moving them, deleting them, etc.

Although selection process of present invention has been illustrated in the context of selecting objects that lie along horizontal lines, those skilled in the art will understand that objects lying along vertical lines may be selected in a similar manner by moving the mouse cursor over the horizontal ruler adjacent the objects.

FIG. 7 is a flow diagram that illustrates the method of the present invention in terms of the steps carried out by the user. The flow diagram summarizes the steps that are described above in conjunction with FIGS. 4A–4D, 5A–5E, and 6A–6H.

The object selection method 250 of the present invention begins at step 255 when the user moves the selection indicator over the appropriate selection identification zone. As discussed above, the mouse cursor is positioned over the horizontal ruler if the user wants to select objects lying along a vertical line and is positioned over the vertical ruler if the user wants to select objects lying along a horizontal line. Once the mouse cursor is moved over a ruler, the user will see the mouse cursor turn into a right-pointing or downward-pointing arrow that indicates the line along which objects may be selected. The user must position the mouse to ensure that the mouse cursor is aligned with the objects that are to be selected.

At step 260 the user presses the mouse button. This results in the computer displaying a selection line that extends across the window from the mouse cursor. The selection line clearly indicates those objects that are subject to being selected. See FIGS. 4C, 5C and 6C.

At step 265, the user determines whether to select only those objects that lie along the selection line extending from the mouse cursor or whether to select additional objects.

If no additional objects are to be selected, the user proceeds to step 270 and releases the mouse button. At that point, the selection line disappears, and the objects that intersect the line are redrawn with selection handles to indicate that they have been selected. See FIGS. 4D and 6D. After the desired objects are selected, the user proceeds to step 275 and performs the desired function (e.g., deleting, copying, moving, etc.) on the selected objects. Those skilled in the art will understand that the steps described immediately above correspond to the steps illustrated generally in FIGS. 4A–4D.

Returning to step 265, if the user determines that additional objects are to be selected, the user proceeds to step 280 and determines whether the additional objects are located adjacent to the objects the lie along the selection line that was displayed when the mouse button was pressed at step 260.

If the additional objects are positioned adjacent the earlier selected objects, the user proceeds to step 285 and drags the mouse cursor along the ruler. This causes the computer to display a second selection line, which indicates the opposite boundary of the rectangular selection region. See FIG. 5D. The user then returns to step 265 and determines whether additional objects are to be selected. Once the rectangular selection region includes all of the objects that are to be selected, the user goes to step 270, and releases the mouse button. As described above, this causes the selection lines to disappear, and the objects that intersected the selection region are redrawn with selection handles to indicate that they have been selected. See FIG. 5E. After the desired objects are selected, the user proceeds to step 275 and performs the desired function (e.g., deleting, copying, moving, etc.) on the selected objects. Those skilled in the art will understand that the steps described immediately above correspond to the steps illustrated generally in FIGS. 5A–5E.

Returning to step 280, if the user determines that the desired objects are not adjacent the earlier selected objects, the user proceeds to step 290 and releases the mouse button. This results in the first selection line disappearing. The objects that intersected the first selection line are redrawn to indicate that they have been selected. See FIG. 6D.

At step 295, the user moves the mouse cursor over the ruler adjacent the next objects that are to be selected. See FIG. 6E. At step 300, the user presses the SHIFT key on the keyboard in order to indicate to the application program that the subsequently selected objects are to be added to the existing group of selected objects.

At step 305, the user presses the mouse button, and a selection line is displayed. See FIG. 6F. The user then returns to step 265 and repeats the process described. This involves determining whether additional objects are to be selected and, if so, whether they are adjacent to the current selection line. If additional, adjacent objects are to be selected, the user will carry out steps 280 and 285. See FIG. 6G.

Those skilled in the art will appreciate that the method 250 may be used to select several groups of objects using the single click method of FIGS. 4A–4D and/or the drag method of FIGS. 5A–5E. Likewise, the method 250 is not restricted to selecting either rows or columns but may be used to select both rows and columns of objects. The method 250 of the present invention may also be used in conjunction with conventional object selection techniques that include clicking on an object and dragging the mouse to form a selection box around one or more objects.

FIG. 8 is a state diagram illustrating the method 350 of present invention as implemented by an application program running on a personal computer. The purpose of the state diagram is to illustrate the interaction between the operating system and the application program. As described above, the operating system provides input and window-management messages to the application program. Window procedures in the application program examine and respond to the messages that are received from the operating system.

The principle messages associated with the operation of the method of the present invention are WM_MOUSE-MOVE, WM_LBUTTONDOWN, and WM_LBUT-TONUP. A window procedure receives one these mouse messages from the operating system whenever the mouse cursor passes over the window or the left mouse button is clicked within a window. The operating system posts a WM_MOUSEMOVE message to the appropriate application program when the cursor is moved over the "client area" of a window. When the user presses or releases the left mouse button while the cursor is in the client area, the operating system posts a WM_LBUTTONDOWN or WM_LBUTTONUP message to the window.

The WM_MOUSEMOVE, WM_LBUTTONDOWN, and WM_LBUTTONUP messages each include two parameters known as lParam and wParam. The lParam parameter indicates the position of the mouse cursor. The low order word indicates the x-coordinate, and the high-order word indicates the y-coordinate. The coordinates are given in "client coordinates" where the position is relative to the upper left corner of the client area of the window. The wParam parameter contains flags that indicate the state of the mouse buttons and the SHIFT and CNTRL keys. These can be checked when mouse message processing depends on the state of another mouse button or of the SHIFT and CNTRL keys.

Normally, the operating system posts a mouse message to the window that contains the cursor at the time a mouse event occurs. However, an application program may "capture the mouse" in order to ensure that it continues to receive mouse messages even when the mouse is outside the window's client area. An application program may capture the mouse by calling the SETCAPTURE function provided by the "WINDOWS" operating system. Likewise, an application program releases the mouse by calling the RELEASE-CAPTURE function.

The "WINDOWS" operating system also allows an application program to change the icon that is associated with the mouse cursor. This is accomplished by calling the SETCURSOR function and providing the appropriate parameters.

The preferred method 350 for selecting objects begins at the idle state 355. At this point, the preferred application program is running, and the mouse cursor is not positioned over the selection identification zones, which include the vertical and horizontal rulers. Those skilled in the art will understand that the method 350 is associated with object selection only and that the application program may perform any of a variety of functions while the method 350 is in its idle state. FIGS. 4A, 5A, and 6A are examples of the display when the method 350 is in the idle state 355.

As mentioned above, the application program will receive WM_MOUSEMOVE, WM_LBUTTONDOWN, and WM_LBUTTONUP messages whenever the mouse is moved over the application window or whenever the mouse button is actuated while the mouse cursor is in the window. However, the method 350 remains in the idle state 355 as long as the messages from the operating system indicate that the mouse cursor is not positioned over the horizontal or vertical rulers.

The method 350 leaves the idle state 355 when the operating system mouse message parameters indicates that the mouse cursor is positioned over the vertical or horizontal rulers (Mouse Move=Ruler). When this occurs, the method proceeds to state 360, and uses the SETCURSOR function to instruct the operating system to set the mouse cursor icon to a right-pointing or downward-pointing arrow.

The method 350 remains in state 360 as long as the mouse cursor is located over one of the rulers. If the mouse cursor is moved away from the ruler (Mouse Move≠Ruler), the method uses the SETCURSOR function to restore the mouse cursor to the previous cursor icon and returns to the idle state 355.

The method 350 will also exit the state 360 when the WM_LBUTTONDOWN message (Left Mouse Button Down) is received from the operating system. If the parameters included in the message from the operating system indicate that the SHIFT key was not pressed when the mouse button was pressed, the method proceeds to state 365. If the SHIFT key was pressed, the method proceeds to step 370.

At step 365, the application program clears any objects that may have been selected by the user prior to the mouse button being pressed. The method then proceeds to step 370.

At step 370, the application program causes the selection line, which extends from the mouse cursor, to be displayed and captures the mouse. Those skilled in the art will be familiar with the operating system functions that the application program uses to cause lines and other graphic objects to be displayed on the display. The present invention uses the PATBLT function, in conjunction with the appropriate parameters, to cause the selection line to be displayed.

At step 370, the method 350 uses the SETCAPTURE function to capture the mouse. This ensures that the application program will continue to receive mouse data from the operating system regardless of where the mouse cursor is moved.

From state 370, the method 350 may proceed to any of three states. If the application program receives a WM_KEYDOWN message from the operating system indicating that the escape (ESC) key has been pressed, the method removes the selection line and returns to the idle state 355.

If, while at state 370, the application receives a WM_LBUTTONUP (Left Mouse Button Up) message from the operating system, the method proceeds to state 375, where the application programs removes the selection line, redraws the selected objects, and releases the mouse (using the RELEASECAPTURE function).

After the selection line is erased, the application program determines which objects have been selected based on the position of the selection line and the location of the objects in the window. Those skilled in the art will appreciate that this process involves comparing the coordinates of the selection line with the coordinates of the objects, and selecting only those objects that intersect the selection line. Once the application programs identifies the selected objects, the program causes them to be redrawn with selection handles in order to indicate that they have been selected (see, e.g., FIG. 4D). Once the objects have been redrawn, the method returns to the idle state 355.

Returning again to state 370, if the application receives a mouse move message before the left mouse button is released, the method goes to step 380. At this step, the application program updates the visual feedback provided to the user by causing a second selection line to be drawn and the portion of the ruler between the selection lines to be highlighted. See, e.g. FIG. 5D. The visual feedback will be constantly updated as long as the application program receives mouse move messages and the left mouse button has not be released. Once the mouse button has been released (Left Mouse Button Up), the method proceeds to state 375, where the selection lines are erased, the mouse is released, and the objects are redrawn to indicate they have been selected.

If, while at state 380, the application program receives a WM_KEYDOWN message from the operating system indicating that the escape (ESC) key has been pressed, the method removes the visual feedback and returns to the idle state 355.

Those skilled in the art will appreciate that the preferred method of updating visual feedback at state 380 relies on the mouse being captured at state 370. Once the mouse is captured, the application program will cause the second selection line to follow the horizontal or vertical position of the mouse even if the mouse has been moved outside the application window. Likewise, the mouse cursor will remain as the fight-pointing or downward-pointing arrow even after the mouse cursor is no longer positioned over the ruler.

From the foregoing description, it will be appreciated that the present invention provides a simple, efficient method for selecting free form objects displayed by a computer. The method of the present invention displays an area containing a plurality of free form objects and provides a selection identification zone associated with the area. The method determines when a selection indicator is positioned within the selection identification zone and establishes a selection line or region corresponding to the position of the selection indicator. The set of free form objects is selected by identifying those free form objects that intersect the selection line or region. Thus, the present invention provides an automatic method of selection wherein the selection process is initiated by the user, and the computer selects everything in a selection path without requiring addition mouse movement or input from the user.

The present invention also provides a computer system for selecting free form objects. The system includes a central processing unit (CPU), a display coupled to the CPU for displaying information, and an input device coupled to the CPU for manipulating a selection indicator displayed on the display. The CPU is operative to display an area and a selection identification zone adjacent the area. The displayed area includes a plurality of free form objects. The CPU determines if the selection indicator is positioned over the selection identification zone and identifies a selection region within the area while the selection indicator is positioned over the selection identification zone. The CPU then determines which of the free form objects intersect the selection region.

The present invention has been described in relation to particular embodiments which are intended in all respects to be illustrative rather than restrictive. For example, although the present invention has been described in the context of a relational database management system, those skilled in the art will understand that the principles of the present invention may be applied to, and embodied in, any operating system or application program in which objects are displayed in a free form manner. Likewise, although the preferred selection lines extend across the entire width or length of the document, the selection lines may have a variable length depending on the needs of the user.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for selecting a set of free form objects having a specific display relationship, comprising the steps of:
    displaying an area containing a plurality of free form objects;
    providing a selection identification zone associated with said area;
    determining when a selection indicator is positioned within said selection identification zone;
    displaying a selection region corresponding to the position of said selection indicator, said selection region comprising a line extending from said selection indicator;
    selecting those free form objects that intersect said selection region; and
    altering the appearance of said selected objects in order to indicate that said selected objects have been selected.

2. A method for selecting a set of free form objects as recited in claim 1, wherein said selection identification zone comprises a ruler adjacent said area containing said free form objects.

3. A method for selecting a set of free form objects as recited in claim 1, further comprising the steps of:
    receiving position data from a pointing device associated with said computer, said position data indicative of the position of said selection indicator; and
    receiving button data from a button associated with said pointing device, and
    wherein said selection region is established in response to said button being pressed while said selection indicator is positioned within said selection identification zone.

4. A method for selecting a set of free form objects as recited in claim 3, wherein said pointing device is a mouse and said selection indicator is a mouse cursor.

5. A method for selecting a set of free form objects as recited in claim 1, wherein said selection region comprises a rectangular area.

6. A method for selecting a set of free form objects as recited in claim 1, wherein said display relationship comprises a generally vertical arrangement.

7. A method for selecting a set of free form objects as recited in claim 1, wherein said display relationship comprises a generally horizontal arrangement.

8. A method for selecting free form objects displayed by a computer and located within a rectangular region, comprising the steps of:
    receiving position data from a pointing device associated with said computer, said position data indicative of the position of a cursor;
    receiving button data from a button associated with said pointing device;
    in response to said button being pressed while said cursor is located in a predetermined area, providing a first selection line extending from a first cursor position;
    in response to said pointing device being moved while said button is pressed, providing visual feedback corresponding to an object selection region, said object selection region including a rectangular area between said first selection line and a second selection line extending from a second cursor position;
    in response to said button being released, selecting those free form objects that are included in said selection region; and
    altering the appearance of said selected objects in order to indicate that said selected objects have been selected.

9. A method for selecting free form objects as recited in claim 8, further comprising the steps of:
    determining whether said cursor is positioned in said predetermined area; and
    in response to said cursor being positioned in said predetermined area, changing the shape of said cursor to a predetermined icon indicative that said free form objects may be selected.

10. A method for selecting free form objects as recited in claim 9, wherein said predetermined area comprises a vertical ruler and said predetermined icon is a right-pointing arrow.

11. A method for selecting free form objects as recited in claim 9, wherein said predetermined area comprises a horizontal ruler and said predetermined icon is a downward-pointing arrow.

12. A method for selecting free form objects as recited in claim 8, wherein said selected objects comprise said free forms objects that intersect said selection region.

13. A method for selecting free form objects as recited in claim 8, wherein said selected objects comprise said free form objects that are contained within said selection region.

14. A method for selecting free form objects as recited in claim 8, wherein said visual feedback comprises an indication in said predetermined area.

15. A method for selecting free form objects as recited in claim 8, wherein said pointing device is a mouse and said button is a mouse button.

16. A method for selecting free form objects as recited in claim 8, wherein said predetermined area comprises a ruler located along an edge of a window.

17. A method for selecting free form objects as recited in claim 8, further comprising the steps of:
    upon said button being pressed, determining whether a predetermined key on a keyboard associated with said computer is pressed;
    in response to said predetermined key not being pressed when said button is pressed, clearing any previously selected objects; and
    in response to said predetermined key being pressed when said button is pressed, retaining any previously selected objects.

18. A method for selecting free form objects displayed by a computer, comprising the steps of:
- receiving position data from a pointing device associated with said computer, said position data indicative of the position of a cursor;
- determining whether said cursor is positioned in a predetermined area;
- in response to said cursor being positioned in said predetermined area, changing the shape of said cursor to a predetermined icon indicative that said free form objects may be selected;
- receiving button data from a button associated with said pointing device;
- in response to said button being pressed while said cursor is located in said predetermined area, providing a selection line extending from said cursor; and
- in response to said button being released, determining which of said free form objects intersect said selection line.

19. A method for selecting free form objects as recited in claim 18, further comprising the steps of:
- upon said button being pressed, determining whether a predetermined key on a keyboard associated with said computer is pressed;
- in response to said predetermined key not being pressed when said button is pressed, clearing any previously selected objects; and
- in response to said predetermined key being pressed when said button is pressed, retaining any previously selected objects.

20. A method for selecting free form objects as recited in claim 18, further comprising the steps of:
- in response to said pointing device being moved while said button is pressed, providing visual feedback corresponding to an object selection region, said object selection region including an area between said first selection line and a second selection line extending from a second cursor position; and
- in response to said button being released, determining which of said free term objects am included in said selection region.

21. A method for selecting free form objects as recited in claim 18, wherein said pointing device is a mouse and said button is a mouse button.

22. A method for selecting free form objects as recited in claim 18, wherein said predetermined area is located along an edge of a window.

23. A method for selecting free form objects as recited in claim 22, wherein said predetermined area is a vertical ruler and said predetermined icon is a right-pointing arrow.

24. A method for selecting free form objects as recited in claim 22, wherein said predetermined area is a horizontal ruler and said predetermined icon is a downward-pointing arrow.

25. A computer system for selecting free form objects, comprising:
- a central processing unit (CPU);
- a display coupled to said CPU for displaying information; and
- an input device coupled to said CPU for manipulating a selection indicator displayed on said display;
- said CPU being operative to:
  - display on said display an area and a selection identification zone adjacent said area, said area including a plurality of free form objects;
  - determine if said selection indicator is positioned over said selection identification zone;
  - change the shape of said cursor to a predetermined indicator when said cursor is positioned over said selection identification zone, said predetermined indicator being indicative that said free form objects may be selected;
  - display a selection region within said area while said selection indicator is positioned over said selection identification zone, said selection region comprising a line extending from said cursor; and
  - determine which of said free form objects intersect said selection region.

26. A computer system for selecting free form objects as recited in claim 25, wherein said computer system further comprises a keyboard for providing data corresponding to the status of a key, and wherein said CPU is further operative to:
- determine whether said key is pressed when said button is pressed;
- clearing any previously selected objects if said key is not pressed when said button is pressed; and
- retaining any previously selected objects if said key is pressed when said button is pressed.

27. A computer system for selecting free form objects as recited in claim 25, further comprising a selection button associated with said computer, and wherein said CPU is further operative to:
- determine if said button is pressed or released; and
- identify said selection region in response to said button being pressed while said selection indicator is positioned over said selection region.

28. A computer system for selecting free form objects as recited in claim 25, wherein said input device is a mouse and said button is a mouse button associated with said mouse.

29. A computer-readable medium on which is stored a computer program for selecting free form object displayed by a computer, said computer program comprising instructions which, when executed by a computer, perform the steps of:
- receiving position data from a pointing device associated with said computer, said position data indicative of the position of a cursor;
- determining whether said cursor is positioned in a predetermined area;
- in response to said cursor being positioned in said predetermined area, changing the shape of said cursor to a predetermined icon indicative that said free form objects may be selected;
- receiving button data from a button associated with said pointing device;
- in response to said button being pressed while said cursor is located in said predetermined area, providing a selection line extending from said cursor; and
- in response to said button being released, determining which of said free form objects intersect said selection line.

30. A computer-readable medium as recited in claim 29, wherein said steps performed by said program further comprise:
- upon said button being pressed, determining whether a predetermined key on a keyboard associated with said computer is pressed;
- in response to said predetermined key not being pressed when said button is pressed, clearing any previously selected objects; and in response to said predetermined key being pressed when said button is pressed, retaining any previously selected objects.

31. A computer-readable medium as recited in claim 29, wherein said steps performed by said program further comprise:

in response to said pointing device being moved while said button is pressed, providing visual feedback corresponding to an object selection region, said object selection region including an area between said first selection line and a second selection line extending from a second cursor position; and in response to said button being released, determining which of said free form objects are included in said selection region.

32. A computer-readable medium as recited in claim 29, wherein said pointing device is a mouse and said button is a mouse button.

33. A computer-readable medium as recited in claim 29, wherein said predetermined area is located along an edge of a window.

34. A computer-readable medium as recited in claim 33, wherein said predetermined area is a vertical ruler and said predetermined icon is a right-pointing arrow.

35. A computer-readable medium as recited in claim 33, wherein said predetermined area is a horizontal ruler and said predetermined icon is a downward-pointing arrow.

36. A method for selecting free form objects displayed by a computer, comprising the steps of:

receiving position data from a pointing device associated with said computer, said position data indicative of the position of a cursor;

receiving button data from a button associated with said pointing device;

in response to said button being pressed while said cursor is located in a predetermined area, providing a selection line extending from said cursor;

in response to said button being pressed, determining whether a predetermined key on a keyboard associated with said computer is pressed;

in response to said predetermined key not being pressed when said button is pressed, clearing any previously selected objects;

in response to said predetermined key being pressed when said button is pressed, retaining any previously selected objects; and in response to said button being released, determining which of said free form objects intersect said selection line.

37. A method for selecting free form objects as recited in claim 36, further comprising the steps of:

determining whether said cursor is positioned in said predetermined area; and in response to said cursor being positioned in said predetermined area, changing the shape of said cursor to a predetermined icon indicative that said free form objects may be selected.

38. A method for selecting free form objects as recited in claim 36, further comprising the steps of:

in response to said button being pressed while said cursor is located in said predetermined area, providing a first selection line extending from a first cursor position;

in response to said pointing device being moved while said button is pressed, providing visual feedback corresponding to an object selection region, said object selection region including an area between said first selection line and a second selection line extending from a second cursor position; and in response to said button being released, determining which of said free form objects are included in said selection region.

39. A method for selecting free form objects as recited in claim 36, wherein said pointing device is a mouse and said button is a mouse button.

40. A method for selecting free form objects as recited in claim 36, wherein said predetermined area is located along an edge of a window.

41. A method for selecting free form objects as recited in claim 40, wherein said predetermined area is a vertical ruler and said predetermined icon is a right-pointing arrow.

42. A method for selecting free form objects as recited in claim 40, wherein said predetermined area is a horizontal ruler and said predetermined icon is a downward-pointing arrow.

43. A computer system for selecting free form objects, comprising:

a central processing unit (CPU);

a display coupled to said CPU for displaying information;

an input device coupled to said CPU for manipulating a selection indicator displayed on said display;

a selection button associated with said computer; and a keyboard for providing data corresponding to the status of a key said CPU being operative to:

display on said display an area and a selection identification zone adjacent said area, said area including a plurality of free form objects;

determine if said selection indicator is positioned over said selection identification zone;

determine if said button is pressed or released;

identify said selection region in response to said button being pressed while said selection indicator is positioned over said selection identification zone;

determine whether said key is pressed when said button is pressed;

clearing any previously selected objects if said key is not pressed when said button is pressed;

retaining any previously selected objects if said key is pressed when said button is pressed; and determine which of said free form objects intersect said selection region.

44. A computer system for selecting free form objects as recited in claim 43, wherein said CPU is further operative to change the shape of said selection indicator to a predetermined indicator when said selection indicator is positioned over said selection identification zone, said predetermined indicator being indicative that said free form objects may be selected.

45. A computer system for selecting free form objects as recited in claim 43, wherein said input device is a mouse and said button is a mouse button associated with said mouse.

* * * * *